United States Patent
Ben-Yaacov et al.

(10) Patent No.: US 8,666,524 B2
(45) Date of Patent: Mar. 4, 2014

(54) PORTABLE MUSIC PLAYER AND TRANSMITTER

(75) Inventors: Yaacov Ben-Yaacov, Douglasville, GA (US); Boaz Ben-Yaacov, Douglasville, GA (US)

(73) Assignee: Catch Media, Inc., Douglasville, GA (US)

( * ) Notice: Subject to any disclaimer, the term of this patent is extended or adjusted under 35 U.S.C. 154(b) by 1961 days.

(21) Appl. No.: 10/829,581

(22) Filed: Apr. 21, 2004

(65) Prior Publication Data

US 2004/0267390 A1 Dec. 30, 2004

Related U.S. Application Data

(63) Continuation-in-part of application No. 10/336,443, filed on Jan. 2, 2003, now Pat. No. 7,191,193.

(51) Int. Cl.
*G06F 17/00* (2006.01)
*H04H 40/00* (2008.01)
*H03C 3/12* (2006.01)
*H01Q 11/12* (2006.01)
*H04B 3/48* (2006.01)

(52) U.S. Cl.
USPC .......... 700/94; 455/3.06; 455/115.1; 455/123

(58) Field of Classification Search
USPC ............. 700/94; 455/3.06, 41.2, 41.3, 73, 74, 455/74.1, 99, 95, 121, 123, 115.1, 115.2, 455/115.3, 115.4
See application file for complete search history.

(56) References Cited

U.S. PATENT DOCUMENTS

| | | | |
|---|---|---|---|
| 4,230,990 A | 10/1980 | Lert, Jr. et al. | |
| 4,659,231 A | 4/1987 | Barkouki | |
| 5,016,171 A | 5/1991 | Connolly et al. | |
| 5,129,036 A | 7/1992 | Dean et al. | |
| 5,161,251 A * | 11/1992 | Mankovitz | 455/66.1 |

(Continued)

FOREIGN PATENT DOCUMENTS

| | | |
|---|---|---|
| EP | 0 760 505 A2 | 3/1997 |
| EP | 1 016 991 A2 | 7/2000 |

(Continued)

OTHER PUBLICATIONS

Strietelmeier, Julie, "Gadgeteer Hands on Review: Apple iPod (3rd Generation 30GB Model)", Jun. 6, 2003, The Gadgeteer, http://web.archive.org/web/20030622180433/www.the-gadgeteer.com/apple-ipod-30gb-review.html, pp. 1-10.*

(Continued)

*Primary Examiner* — Davetta W Goins
*Assistant Examiner* — Daniel Sellers
(74) *Attorney, Agent, or Firm* — Blakely, Sokoloff, Taylor & Zafman LLP

(57) ABSTRACT

A hand-held music player for use in conjunction with radios, including a casing, a receiver socket on the casing through which digital audio data is received, a digital-to-analog audio converter housed within the casing, a first transfer socket on the casing through which a song is transferred to a radio transmitter, a second transfer socket on the casing through which meta-data for the song is transferred to the radio transmitter, and a dial on the casing for selecting a song for playback. A method and a computer-readable storage medium are also described.

9 Claims, 22 Drawing Sheets

(56) References Cited

U.S. PATENT DOCUMENTS

| | | | |
|---|---|---|---|
| 5,287,408 A | 2/1994 | Samson | |
| 5,303,326 A | 4/1994 | Dean et al. | |
| 5,715,403 A | 2/1998 | Stefik | |
| 5,892,536 A | 4/1999 | Logan et al. | |
| 5,892,900 A | 4/1999 | Ginter et al. | |
| 5,918,213 A | 6/1999 | Bernard et al. | |
| 5,946,664 A | 8/1999 | Ebisawa | |
| 5,970,390 A | 10/1999 | Koga et al. | |
| 6,088,455 A | 7/2000 | Logan et al. | |
| 6,092,080 A | 7/2000 | Gustman | |
| 6,142,375 A | 11/2000 | Belka et al. | |
| 6,146,276 A | 11/2000 | Okuniewicz | |
| 6,163,711 A * | 12/2000 | Juntunen et al. | 455/557 |
| 6,202,060 B1 | 3/2001 | Tran | |
| 6,266,654 B1 | 7/2001 | Schull | |
| 6,336,219 B1 | 1/2002 | Nathan | |
| 6,372,974 B1 | 4/2002 | Gross et al. | |
| 6,389,162 B2 * | 5/2002 | Maeda | 382/172 |
| 6,407,750 B1 | 6/2002 | Gioscia et al. | |
| 6,449,367 B2 | 9/2002 | Van Wie et al. | |
| 6,463,444 B1 | 10/2002 | Jain et al. | |
| 6,567,984 B1 | 5/2003 | Allport | |
| 6,591,085 B1 * | 7/2003 | Grady | 455/42 |
| 6,608,930 B1 | 8/2003 | Agnihotri et al. | |
| 6,615,192 B1 | 9/2003 | Tagawa et al. | |
| 6,636,588 B2 | 10/2003 | Kimura et al. | |
| 6,662,231 B1 | 12/2003 | Drosset et al. | |
| 6,671,494 B1 * | 12/2003 | James | 455/66.1 |
| 6,697,944 B1 * | 2/2004 | Jones et al. | 713/168 |
| 6,748,537 B2 | 6/2004 | Hughes | |
| 6,771,748 B2 | 8/2004 | Parker et al. | |
| 6,774,604 B2 | 8/2004 | Matsuda et al. | |
| 6,774,796 B2 | 8/2004 | Smith | |
| 6,834,308 B1 | 12/2004 | Ikezoye et al. | |
| 6,847,950 B1 | 1/2005 | Kamibayashi et al. | |
| 6,876,974 B1 | 4/2005 | Marsh et al. | |
| 6,880,081 B1 | 4/2005 | Itkis | |
| 6,888,950 B2 | 5/2005 | Siskin et al. | |
| 6,934,837 B1 | 8/2005 | Jaisimha et al. | |
| 6,947,598 B2 | 9/2005 | Yogeshwar et al. | |
| 6,983,371 B1 | 1/2006 | Hurtado et al. | |
| 7,006,424 B2 | 2/2006 | Nonaka et al. | |
| 7,020,888 B2 | 3/2006 | Reynolds et al. | |
| 7,046,239 B2 | 5/2006 | Asai et al. | |
| 7,046,956 B1 | 5/2006 | Cohen | |
| 7,073,063 B2 | 7/2006 | Peinado | |
| 7,119,267 B2 | 10/2006 | Hirade et al. | |
| 7,134,145 B1 | 11/2006 | Epstein | |
| 7,158,842 B2 * | 1/2007 | Ohmura et al. | 700/94 |
| 7,170,999 B1 | 1/2007 | Kessler et al. | |
| 7,188,186 B1 | 3/2007 | Meyer et al. | |
| 7,191,193 B2 | 3/2007 | Ben-Yaacov et al. | |
| 7,203,966 B2 | 4/2007 | Abburi et al. | |
| 7,231,656 B1 | 6/2007 | Nathan | |
| 7,281,034 B1 | 10/2007 | Eyal | |
| 7,343,347 B2 | 3/2008 | Ostrover et al. | |
| 7,363,372 B2 | 4/2008 | Potenzone et al. | |
| 7,370,017 B1 | 5/2008 | Lindeman et al. | |
| 7,389,273 B2 | 6/2008 | Irwin et al. | |
| 7,415,439 B2 | 8/2008 | Kontio et al. | |
| 7,440,365 B2 | 10/2008 | Hattori et al. | |
| 7,512,549 B1 | 3/2009 | Morita et al. | |
| 7,516,213 B2 | 4/2009 | Cunningham et al. | |
| 7,523,312 B2 | 4/2009 | Kalker et al. | |
| 7,600,266 B2 | 10/2009 | Thomas | |
| 7,707,221 B1 | 4/2010 | Dunning et al. | |
| 7,730,300 B2 | 6/2010 | Candelore | |
| 7,756,792 B2 | 7/2010 | Hughes | |
| 7,756,915 B2 | 7/2010 | Ben-Yaacov et al. | |
| 7,761,176 B2 | 7/2010 | Ben-Yaacov et al. | |
| 7,925,591 B2 | 4/2011 | Gajjala et al. | |
| 2001/0018693 A1 | 8/2001 | Jain et al. | |
| 2001/0051996 A1 | 12/2001 | Cooper et al. | |
| 2002/0007350 A1 | 1/2002 | Yen | |
| 2002/0007351 A1 | 1/2002 | Hillegass et al. | |
| 2002/0010759 A1 | 1/2002 | Hitson et al. | |
| 2002/0015362 A1 | 2/2002 | Cowgill et al. | |
| 2002/0032747 A1 | 3/2002 | Toki | |
| 2002/0045960 A1 | 4/2002 | Phillips et al. | |
| 2002/0066115 A1 | 5/2002 | Wendelrup | |
| 2002/0068558 A1 | 6/2002 | Janik | |
| 2002/0076051 A1 | 6/2002 | Nii | |
| 2002/0077984 A1 | 6/2002 | Ireton | |
| 2002/0077986 A1 | 6/2002 | Kobata et al. | |
| 2002/0087887 A1 | 7/2002 | Busam et al. | |
| 2002/0100062 A1 | 7/2002 | Lowthert et al. | |
| 2002/0114466 A1 | 8/2002 | Tanaka et al. | |
| 2002/0116277 A1 | 8/2002 | Kraft | |
| 2002/0120456 A1 | 8/2002 | Berg et al. | |
| 2002/0126762 A1 | 9/2002 | Tanaka | |
| 2002/0138852 A1 | 9/2002 | Reynolds et al. | |
| 2002/0157002 A1 | 10/2002 | Messerges et al. | |
| 2002/0177914 A1 | 11/2002 | Chase | |
| 2002/0184537 A1 | 12/2002 | Inokuchi et al. | |
| 2002/0186844 A1 | 12/2002 | Levy et al. | |
| 2002/0189427 A1 | 12/2002 | Pachet | |
| 2003/0009423 A1 | 1/2003 | Wang et al. | |
| 2003/0018491 A1 | 1/2003 | Nakahara et al. | |
| 2003/0018582 A1 | 1/2003 | Yaacovi | |
| 2003/0021441 A1 | 1/2003 | Levy et al. | |
| 2003/0028622 A1 | 2/2003 | Inoue et al. | |
| 2003/0040206 A1 | 2/2003 | Wang et al. | |
| 2003/0050894 A1 | 3/2003 | Kambayashi et al. | |
| 2003/0065642 A1 | 4/2003 | Zee | |
| 2003/0076955 A1 | 4/2003 | Alve et al. | |
| 2003/0078891 A1 | 4/2003 | Capitant | |
| 2003/0079030 A1 | 4/2003 | Cocotis et al. | |
| 2003/0079038 A1 | 4/2003 | Robbin et al. | |
| 2003/0084126 A1 | 5/2003 | Kumar et al. | |
| 2003/0084306 A1 | 5/2003 | Abburi et al. | |
| 2003/0098817 A1 | 5/2003 | Choi | |
| 2003/0110502 A1 | 6/2003 | Creed et al. | |
| 2003/0120541 A1 | 6/2003 | Siann et al. | |
| 2003/0131252 A1 | 7/2003 | Barton | |
| 2003/0135513 A1 | 7/2003 | Quinn et al. | |
| 2003/0154378 A1 | 8/2003 | Hirano | |
| 2003/0158737 A1 * | 8/2003 | Csicsatka | 704/273 |
| 2003/0163823 A1 | 8/2003 | Logan et al. | |
| 2003/0172113 A1 | 9/2003 | Cameron et al. | |
| 2003/0177073 A1 * | 9/2003 | Ogai | 705/26 |
| 2003/0182184 A1 | 9/2003 | Strasnick et al. | |
| 2003/0188150 A1 | 10/2003 | Ohkado et al. | |
| 2003/0217057 A1 | 11/2003 | Kuroiwa et al. | |
| 2003/0226012 A1 | 12/2003 | Asokan et al. | |
| 2003/0229654 A1 | 12/2003 | Bibas et al. | |
| 2003/0232593 A1 | 12/2003 | Wahlroos et al. | |
| 2003/0233929 A1 | 12/2003 | Agnihotri | |
| 2004/0003281 A1 | 1/2004 | Sonoda et al. | |
| 2004/0003398 A1 | 1/2004 | Donian et al. | |
| 2004/0013125 A1 | 1/2004 | Betker et al. | |
| 2004/0021704 A1 | 2/2004 | Mitsutake | |
| 2004/0049559 A1 * | 3/2004 | Saubade | 709/219 |
| 2004/0058649 A1 * | 3/2004 | Grady | 455/42 |
| 2004/0064500 A1 | 4/2004 | Kolar et al. | |
| 2004/0078338 A1 | 4/2004 | Ohta et al. | |
| 2004/0089141 A1 | 5/2004 | Georges et al. | |
| 2004/0089142 A1 | 5/2004 | Georges et al. | |
| 2004/0117442 A1 * | 6/2004 | Thielen | 709/203 |
| 2004/0121748 A1 | 6/2004 | Glaza | |
| 2004/0128324 A1 | 7/2004 | Sheynman et al. | |
| 2004/0131255 A1 | 7/2004 | Ben-Yaacov et al. | |
| 2004/0133657 A1 | 7/2004 | Smith et al. | |
| 2004/0133908 A1 | 7/2004 | Smith et al. | |
| 2004/0133914 A1 | 7/2004 | Smith et al. | |
| 2004/0148191 A1 | 7/2004 | Hoke, Jr. | |
| 2004/0158741 A1 | 8/2004 | Schneider | |
| 2004/0187014 A1 | 9/2004 | Molaro | |
| 2004/0199771 A1 | 10/2004 | Morten et al. | |
| 2004/0224638 A1 * | 11/2004 | Fadell et al. | 455/66.1 |
| 2004/0225612 A1 | 11/2004 | Shimojima et al. | |
| 2004/0252966 A1 | 12/2004 | Holloway et al. | |
| 2004/0253945 A1 | 12/2004 | Janik | |
| 2005/0004873 A1 | 1/2005 | Pou et al. | |
| 2005/0014536 A1 | 1/2005 | Grady | |

(56) References Cited

U.S. PATENT DOCUMENTS

| | | |
|---|---|---|
| 2005/0015464 A1 | 1/2005 | Young |
| 2005/0055352 A1 | 3/2005 | White et al. |
| 2005/0065624 A1 | 3/2005 | Ben-Yaacov et al. |
| 2005/0071280 A1 | 3/2005 | Irwin et al. |
| 2005/0071663 A1 | 3/2005 | Medvinsky et al. |
| 2005/0120380 A1 | 6/2005 | Wolfe |
| 2005/0125087 A1 | 6/2005 | Ben-Yaacov et al. |
| 2005/0169114 A1 | 8/2005 | Ahn |
| 2005/0171938 A1 | 8/2005 | Fisher et al. |
| 2005/0210261 A1 | 9/2005 | Kamperman et al. |
| 2005/0210395 A1 | 9/2005 | Wakita et al. |
| 2005/0227679 A1 | 10/2005 | Papulov |
| 2006/0010075 A1 | 1/2006 | Wolf |
| 2006/0030961 A1 | 2/2006 | Lin |
| 2006/0031257 A1 | 2/2006 | Lipscomb et al. |
| 2006/0031558 A1 | 2/2006 | Ortega et al. |
| 2006/0107330 A1 | 5/2006 | Ben-Yaacov et al. |
| 2006/0122881 A1 | 6/2006 | Walker et al. |
| 2006/0217967 A1* | 9/2006 | Goertzen et al. ............ 704/201 |
| 2006/0242083 A1 | 10/2006 | Chavez |
| 2007/0030972 A1 | 2/2007 | Glick et al. |
| 2007/0038999 A1 | 2/2007 | Millington |
| 2007/0094276 A1 | 4/2007 | Isaac |
| 2007/0112678 A1 | 5/2007 | Himelfarb |
| 2007/0156762 A1 | 7/2007 | Ben-Yaacov et al. |
| 2007/0162395 A1 | 7/2007 | Ben-Yaacov et al. |
| 2007/0198426 A1 | 8/2007 | Yates et al. |
| 2007/0244794 A1 | 10/2007 | Fenley |
| 2007/0250403 A1 | 10/2007 | Altschuler |
| 2007/0271184 A1 | 11/2007 | Niebert et al. |
| 2008/0052516 A1 | 2/2008 | Tachibana et al. |
| 2008/0183595 A1 | 7/2008 | Sakamoto |
| 2008/0320598 A1 | 12/2008 | Ben-Yaacov et al. |
| 2008/0320605 A1 | 12/2008 | Ben-Yaacov et al. |
| 2009/0043412 A1 | 2/2009 | Ben-Yaacov et al. |
| 2009/0044285 A1 | 2/2009 | Ben-Yaacov et al. |
| 2009/0077190 A1 | 3/2009 | Gupta |
| 2009/0093899 A1 | 4/2009 | Ben-Yaacov et al. |
| 2009/0094663 A1 | 4/2009 | Ben-Yaacov et al. |
| 2009/0106451 A1 | 4/2009 | Zuckerman et al. |
| 2009/0248535 A1 | 10/2009 | Fisher et al. |
| 2010/0036759 A1 | 2/2010 | Ben-Yaacov et al. |
| 2010/0333211 A1 | 12/2010 | Schonfeld et al. |

FOREIGN PATENT DOCUMENTS

| | | |
|---|---|---|
| EP | 1 074 926 A2 | 2/2001 |
| EP | 1 251 440 A2 | 10/2002 |
| EP | 1 304 874 A2 | 4/2003 |
| EP | 1 304 874 A3 | 4/2003 |
| EP | 1 307 062 A1 | 5/2003 |
| EP | 1 898 323 A1 | 3/2008 |
| EP | 2 096 599 A1 | 9/2009 |
| EP | 2 098 973 A1 | 9/2009 |
| GB | 2 364 215 A | 1/2002 |
| GB | 2 380 364 A | 4/2003 |
| JP | 08-046538 | 2/1996 |
| JP | 08-152881 | 6/1996 |
| JP | 08-263440 | 10/1996 |
| JP | 10-308056 | 11/1998 |
| JP | 11-073730 | 3/1999 |
| JP | 11-122129 | 4/1999 |
| JP | 11-259964 | 9/1999 |
| JP | 2000-269904 | 9/2000 |
| JP | 2000-307527 | 11/2000 |
| JP | 2000-315177 | 11/2000 |
| JP | 2001-022843 | 1/2001 |
| JP | 2001-075871 | 3/2001 |
| JP | 2001-236081 | 8/2001 |
| JP | 2001-320373 | 11/2001 |
| JP | 2002-015147 | 1/2002 |
| JP | 2002-162973 | 6/2002 |
| JP | 2002-230895 | 8/2002 |
| JP | 2002-245066 | 8/2002 |
| JP | 2002-262254 | 9/2002 |
| JP | 2002-351744 | 12/2002 |
| JP | 2002-359803 | 12/2002 |
| JP | 2003-114949 | 4/2003 |
| JP | 2003-124921 | 4/2003 |
| JP | 2003-338976 | 11/2003 |
| JP | 2003-339000 | 11/2003 |
| JP | 2003-536144 | 12/2003 |
| JP | 2004-517377 | 6/2004 |
| JP | 2004-185172 | 7/2004 |
| JP | 2005-071522 | 3/2005 |
| JP | 2005-517238 | 6/2005 |
| JP | 2005-539469 | 12/2005 |
| JP | 2006-515099 | 5/2006 |
| WO | WO 00/07310 A1 | 2/2000 |
| WO | WO 00/45291 A1 | 8/2000 |
| WO | WO 00/58963 A2 | 10/2000 |
| WO | WO 01/13311 A | 2/2001 |
| WO | WO 01/25948 A1 | 4/2001 |
| WO | WO 01/46783 A2 | 6/2001 |
| WO | WO 01/53963 A1 | 7/2001 |
| WO | WO 01/62004 A2 | 8/2001 |
| WO | WO 01/63822 A2 | 8/2001 |
| WO | WO 01/95206 A1 | 12/2001 |
| WO | WO 02/31618 A2 | 4/2002 |
| WO | WO 03/005145 A2 | 1/2003 |
| WO | WO 03/034408 A2 | 4/2003 |
| WO | WO 03/058410 A | 7/2003 |
| WO | WO 2004/027588 A2 | 4/2004 |
| WO | WO 2004/061547 A2 | 7/2004 |
| WO | WO 2004/070538 A2 | 8/2004 |
| WO | WO 2005/106876 A2 | 11/2005 |
| WO | WO 2006/019608 A1 | 2/2006 |
| WO | WO 2006/058149 A2 | 6/2006 |
| WO | WO 2008/070062 A2 | 6/2008 |
| WO | WO 2007/055845 A2 | 7/2008 |

OTHER PUBLICATIONS

Staff, "Griffin Technology Ships New iTrip for 3rd Generation iPods", Oct. 8, 2003, Mac Observer, http://web.archive.org/web/20040109234748/http://www.macobserver.com/article/2003/10/08.5.shtml, pp. 1-2.*

Carey, David, "Apple's iPod packs a pricey punch", Mar. 26, 2002, Techonline, http://www.techonline.com/article/printArticle.jhtml?articleID=193100821, p. 1 and 2 figures.*

Lloyd, Dennis, "Griffin iTrip", May 8, 2003, www.ilounge.com, pp. 1-6.*

M. Nilsson, "ID3 tag version 2.4.0—Native Frames," XP002350036, ID3V2.4.0-frames.txt, v 1.1. Retrieved from the Internet: http:www/id3.org/id3v2.4.0-frames.txt (Nov. 1, 2000).

"GoTuit Media Secures $2.1 Million in First-Round Angel Funding Led by Topol Group," PR Newswire, pNA (Aug. 15, 2000).

PCT Invitation to Pay Additional Fees for PCT Counterpart Application No. PCT/US2005/013645 Containing Communication Relating to the Results of the Partial International Search Report (Sep. 5, 2005).

"Wikipedia: Fairplay," XP-002414372, Wikipedia, The Free Encyclopedia (Online), 4 pgs. (Oct. 11, 2005).

PCS-Electronics, "RDS Max 2.0," XP002336990, Internet Article, Online!, retrieved from the Internet: http://web.archive.org/web/20040413050058/www.ppcs-electronics.com/en/products.php?sub=EDS_encod> (Mar. 22, 2004).

Amazon.com Description, "HP Jordana 545 Pocket PC," XP002336991, Internet Article, Online!, retrieved from the Internet: http://www.pdasupport..com/Jordana545.htm> (Apr. 2000).

R. Menta, "Review: Neuros MP3 Digital Audio Computer," MP3NEWSWIRE.NET, Online!, XP002336992, retrieved from the Internet: http://www.mp3newswire.net/stories/2003/neuros.html> (May 29, 2003).

Philips Research, "Audtio Fingerprinting for Automatic Music Recognition," XP002347089, www.research.philips.com, Online!, retrieved from the Internet: http://www.research.philips.com/initiatives/contentid/downloads/audio_fingerprinting_leaflet.pdf> (Mar. 2004).

(56) References Cited

OTHER PUBLICATIONS

J. Haitsma, T. Kalker, "A highly Robust Audio Fingerprinting System," XP002347090, IRCAM, Online!, retrieved from the internet: http://ismir2002.ismir.net/proceedings/02-FP04-2.pdf> (2002).

Internet Article, "IPOD track display," XP00236993, retrieved from the Internet: http://halfbakery.com/idea/IPOD_20track_20display> (Sep. 18, 2003).

Internet Article, "MINI2 Forums—RDS—Radio Text," XP002336994, retrieved from the Internet: http://www.mini2.com/forum/archive/index.php/t-24296> (Feb. 7, 2003).

Internet Article, "Digiana AudiaX FM Linker," XP002337103, retrieved from the Internet: http://www.i4u.com/article396.html> (May 30, 2003).

PCT Notification of Transmittal of International Search Report and the Written Opinion of the International Searching Authority, or the Declaration for PCT Counterpart Application No. PCT/US05/013645 Containing International Search Report, 22 pgs. (Oct. 25, 2005).

International Search Report for Counterpart PCT Application No. PCT/IL2003/001109 (search report mailed Nov. 14, 2004).

European Search Report for EP Counterpart Application No. EP 07120338.4-1247, 7 pgs. (Feb. 5, 2008).

Office Action for U.S. Appl. No. 12/337,598, mailed Sep. 6, 2011, 13 pgs.

Office Action for U.S. Appl. No. 12/337,600, mailed Jul. 8, 2011, 15 pgs.

Office Action for U.S. Appl. No. 12/252,926, mailed May 24, 2011, 15 pgs.

Office Action for U.S. Appl. No. 12/252,926, mailed Oct. 7, 2011, 16 pgs.

Office Action for U.S. Appl. No. 12/252,941, mailed May 10, 2011, 12 pgs.

Office Action for U.S. Appl. No. 12/252,941, mailed Jul. 25, 2011, 3 pgs.

Office Action for U.S. Appl. No. 12/200,586, mailed Oct. 3, 2011, 20 pgs.

Office Action for U.S. Appl. No. 12/200,606, mailed Jun. 20, 2011, 15 pgs.

Office Action for U.S. Appl. No. 12/200,606, mailed Jan. 26, 2012, 19 pgs.

Office Action for U.S. Appl. No. 11/607,163, mailed Aug. 18, 2011, 17 pgs.

Office Action for Canadian Application No. 2,557,895, mailed Jul. 27, 2011, 6 pgs.

Office Action for Israel Application No. 177630, mailed Jul. 13, 2011, 5 pgs. (including English Language Summary of the Office Action).

Office Action for Japanese Application No. 509639/2007, mailed Jul. 23, 2011, 4 pgs. (including English Language Summary of the Office Action).

Office Action for U.S. Appl. No. 12/337,598, mailed Feb. 18, 2011, 10 pgs.

Office Action for U.S. Appl. No. 12/337,600, mailed Jan. 24, 2011, 15 pgs.

Office Action for Japanese Application No. 564400/2004, mailed Nov. 22, 2010, 4 pgs. (including English Language Summary of the Office Action).

Office Action for Japanese Application No. 509639/2007, mailed Jan. 18, 2011, 6 pgs. (including English Language Summary of the Office Action).

R. Mori, et al., "Superdistribution: An Electronic Infrastructure for the Economy of the Future", XP002072402, Transactions of Information Processing Society of Japan, vol. 38, No. 7, pp. 1465-1472, (Jul. 1997).

Supplementary European Search Report for EP03780596, 2 pgs., (Feb. 8, 2008).

Office Action for U.S. Appl. No. 10/336,443, mailed Oct. 4, 2004, 13 pgs.

Office Action for U.S. Appl. No. 10/336,443, mailed May 17, 2005, 16 pgs.

Office Action for U.S. Appl. No. 10/336,443, mailed Oct. 21, 2005, 17 pgs.

Office Action for U.S. Appl. No. 10/336,443, mailed May 31, 2006, 20 pgs.

Office Action for U.S. Appl. No. 11/708,997, mailed Feb. 9, 2009, 15 pgs.

Office Action for U.S. Appl. No. 11/708,997, mailed Sep. 28, 2009, 21 pgs.

Office Action for U.S. Appl. No. 10/893,473, mailed Jan. 9, 2009, 9 pgs.

Office Action for U.S. Appl. No. 10/893,473, mailed Jul. 21, 2009, 13 pgs.

Office Action for U.S. Appl. No. 10/893,473, mailed Mar. 3, 2010, 16 pgs.

Office Action for U.S. Appl. No. 10/893,473, mailed Aug. 3, 2010, 16 pgs.

Office Action for U.S. Appl. No. 12/252,926, mailed Oct. 6, 2010, 15 pgs.

Office Action for U.S. Appl. No. 12/252,941, mailed Nov. 12, 2010, 12 pgs.

Office Action for U.S. Appl. No. 11/261,687, mailed Oct. 20, 2008, 10 pgs.

Office Action for U.S. Appl. No. 11/261,687, mailed Jul. 9, 2009, 11 pgs.

Office Action for U.S. Appl. No. 11/261,687, mailed Oct. 27, 2009, 3 pgs.

Office Action for U.S. Appl. No. 10/997,606, mailed Apr. 14, 2008, 27 pgs.

Office Action for U.S. Appl. No. 10/997,606, mailed Oct. 27, 2008, 21 pgs.

Office Action for U.S. Appl. No. 10/997,606, mailed Jun. 26, 2009, 15 pgs.

Office Action for Canadian Application No. 2,557,895, mailed Jun. 8, 2010, 2 pgs.

Office Action for European Application No. 05737653.5, mailed Nov. 14, 2008, 1 pg.

Office Action for Israel Application No. 177630, mailed Aug. 8, 2010, 7 pgs. (including English Language Summary of the Office Action).

Office Action for Japanese Application No. 564400/2004, mailed Apr. 14, 2009, 9 pgs. (including English Language Summary of the Office Action).

Office Action for Japanese Application No. 564400/2004, mailed Jun. 29, 2010, 5 pgs. (including English Language Summary of the Office Action).

Tony Bove, "The iPod Companion". Muska & Lipman, 27 pgs. (including Table of Contents, ix, 1-21, 3, and 80), (2003).

Antonin Billet, "PDA: le Sypod veut séduire par le multimédia", retrieved from the Internet: http://www.01net.com/editorial/175530/pda-le-sypod-veut-seduire-par-le-multimedia/, 3 pgs. (including Google translation), (Feb. 2, 2004).

"Songs-DB 1.3", Soft32, retrieved from the Internet: http://songs-db.soft32.com/, 5 pgs., (Jun. 14, 2003).

Internetnews.Com Staff, "Songcatcher Snatches Tunes From Live Radio", retrieved from the Internet: http://www.internetnews.com/ec-news/print.php/532651, 1 pg., (Dec. 12, 2000).

Office Action for U.S. Appl. No. 12/337,598, mailed Oct. 1, 2012, 13 pgs.

Office Action for U.S. Appl. No. 12/337,598, mailed Jun. 4, 2013, 17 pgs.

Office Action for U.S. Appl. No. 12/337,600, mailed Apr. 24, 2013, 15 pgs.

Office Action for U.S. Appl. No. 12/252,926, mailed Apr. 4, 2012, 15 pgs.

Office Action for U.S. Appl. No. 12/200,586, mailed Jun. 14, 2012, 14 pgs.

Office Action for U.S. Appl. No. 11/607,163, mailed May 22, 2012, 16 pgs.

(56) References Cited

OTHER PUBLICATIONS

Office Action for U.S. Appl. No. 11/607,163, mailed May 2, 2013, 18 pgs.

Office Action for U.S. Appl. No. 12/495,766, mailed Mar. 6, 2013, 20 pgs.

Office Action for European Application No. 05737653.5, mailed Mar. 15, 2012, 11 pgs.

Office Action for European Application No. 07120338.4, mailed Mar. 16, 2012, 6 pgs.

Office Action for Canadian Application No. 2,699,563, mailed Jan. 21, 2013, 3 pgs.

* cited by examiner

PORTABLE MUSIC PLAYER AND TRANSMITTER

CROSS REFERENCE TO RELATED APPLICATION

This application is a continuation-in-part application of and claims priority to U.S. patent application Ser. No. 10/336,443, filed Jan. 2, 2003, now U.S. Pat. No. 7,191,193, entitled "AUTOMATIC DIGITAL MUSIC LIBRARY BUILDER."

FIELD

Embodiments of the invention relate to mobile digital music players, such as MP3 players, and to mobile digital music transmitters.

BACKGROUND

Digital music players are proliferating as stand-alone consumer electronic devices (such as MP3 players), as bundled components within portable devices such as personal digital assistants and cell-phones, and as home network appliances. Listeners typically build up their own personal libraries of digital songs, which are stored on memory units such as hard disk drives and removable memory cards. Digital songs are typically acquired through the Internet via subscription services and peer-to-peer exchanges, or by converting songs from a compact disc ("CD") and importing them into an MP3 library.

Digital songs typically include audio data and peripheral data, referred to as meta-data, used to index the songs within the listener's library. For example, within an MP3 file, meta-data is accessed through an ID3Tag. By indexing the songs, a listener can search his library and access individual songs therein. Typically audio players provide a user interface through which users view meta-data.

Reference is now made to FIG. 1, which is an illustration of a prior art user interface for a Windows media player, indicating meta-data displayed within a window frame 110, and an index for accessing individual songs, displayed within a window frame 120.

Building up a digital music library requires a lot of work. Typically, the listener first searches the Internet for one or more songs of interest, identifies locations of the songs, and downloads them into a database associated with a media player. Songs are typically stored as digital files, formatted in compliance with a standard format, such as MP3 or WMA. Once the songs are downloaded, the listener typically uses software such as Windows Media player ("WMP") or Winamp to play the songs on a computer, or alternatively he uses a hardware device, such as an Ipod™ or an MP3 player, to play the songs. WMA files embed meta-data within the files, and also within the file names themselves.

Often individuals spend numerous nights downloading their favorite songs and building their own personal music libraries. Downloading music files from the Internet may infringe copyrights unless the files are obtained through a service that pays royalties to the recording industry.

A shortcoming in the digital music world is the great effort required to build custom music libraries. An alternative is to purchase libraries that have been prepared by others. But often someone else's library does not match a listener's taste, and the listener prefers to collect his own favorite songs.

Popular sources for listeners to hear their favorite songs are music stations. Cable, satellite broadcast and the Internet provide music channels for almost every genre of music—classical music, rock and roll, jazz, music of the 80's, etc. A listener can enjoy music according to his taste by subscribing to such broadcast services.

Ideally, a listener building up his personal digital music library would like to be able to record his favorite songs from such broadcast services. Raw audio recording from a music station, however, does not provide the meta-data necessary to identify such songs and incorporate them into a digital music library. Using today's technology, a listener has no choice but to painstakingly label each such song recorded from a music station with appropriate meta-data—a process that can last hours in order to build even a modest library with a few hundred songs.

Moreover, in addition to identifying each song, the listener has to manually separate each song from the next, because the songs are played sequentially on the music station.

SUMMARY

Embodiments of the invention enable a listener to easily build a digital library of music that is cataloged and easily accessible for personal playback. Embodiments of the present invention provide a solution for the tens of millions of households in the U.S. and around the world that receive, either through digital cable or over Direct Broadcast Satellite ("DBS") transmissions, music channels such as Music Choice, DMX, and other commercial-free music services. Such music channels are currently broadcast as video and audio channels in which the audio feed includes a song being played, and typically the simultaneous video feed has information about the song, its artists, and the label whose song is being broadcast.

For one embodiment, a device referred to hereinafter as a "Nest" is connected to a digital cable box or digital satellite receiver in the same fashion that a video cassette recorder ("VCR") or personal video recorder ("PVR") is connected thereto—namely, by connecting the video output and the left and right audio outputs of the receiver to the device. For one embodiment, the Nest has the ability to record and to playback by category, much like a PVR. Whereas a PVR relies on data received through an electronic program guide to identify what it is recording, and to name the recorded shows, one embodiment of the Nest uses information in the video portion of the broadcast to identify the song that is being recorded. Alternatively, the Nest uses information from an audio waveprint database to identify the song that is being recorded.

For one embodiment, the Nest allows a listener to record in either a "record all" mode or a "selective mode." In "record all" mode, the listener sets his receiver to a music channel broadcasting a genre of music that he enjoys, and he presses a record button on the Nest. The Nest then records and categorizes all songs played during the recording period, until the listener either stops the recording process by pressing "stop" on the Nest, or changes the channel on his receiver. Alternatively, the Nest can be programmed to stop recording at the end of a preset time period set by the listener.

For one embodiment of the present invention, the Nest records each song once, and, if a song is broadcast more than once, the Nest marks the song as being virtually recorded an additional time, each time the song is re-broadcast, for managing digital rights.

In this fashion the Nest builds a personal digital music library for the listener. Assuming that an average song lasts approximately three minutes and assuming a 25% re-broadcast rate, the Nest records approximately 360 songs during a typical 24 hour day of operation. Thus in approximately a one week period of recording day and night, the Nest builds a library of over 2,500 songs, if left on one specific genre channel. In many cases a listener records only at night when he is asleep. This is because the recording process requires the receiver to be set to a music channel while recording, and if the listener wants to watch television, he will inherently change the viewing channel from the music channel. Thus, in a household with average daily television viewing, a library of over 2,500 songs for a specific genre is built by the Nest within two weeks of night recording.

In "selective mode" the Nest is set to record a specific artist or song, and then when that artist or song is broadcast, the Nest records the music. The "selective mode" is most useful if the desired song or artist is played frequently on one of the genre channels. If the desired song or artist is less frequently played, however, there is no guarantee that the Nest will record the requested music.

Songs recorded on the Nest can be heard in a number of different fashions. A convenient way to listen to songs on the Nest in a listener's living room is to connect audio out of the Nest to an amplifier and stereo system, and to connect video out to a television. The listener can then choose, either through a front panel interface, or by remote control through a television interface, songs that he would like to listen to. The listener can create play lists or choose to listen to songs in the order they were played by the broadcast music channel.

In addition to listening to the songs on the Nest, for one embodiment of the invention, the listener can "check out" a set of songs to a hand-held digital music player, referred to as an "Egg," which can be plugged into one or more docking ports on the Nest. When the listener has finished listening to songs on his Egg, he plugs his Egg back into a cradle on the Nest in order to check-in songs that are no longer being listened to on that specific player, and check out new songs for new listening.

For one embodiment of the invention, the Nest incorporates digital rights management with songs recorded, thereby preventing a listener from freely making unlimited copies of the recorded songs. For one embodiment, a listener is limited to check out of a specific song to the total number of times that that song was broadcast to the Nest. Additionally, an Egg is registered to a single Nest, and the Egg can only check out songs from the Nest to which the Egg is registered.

One embodiment of the invention also includes a device, referred to as a "Shell," which is used for playback of songs in the Egg on a radio, such as an audio deck within an automobile. The Shell includes a radio transmitter that transmits analog audio coming out of the Egg to a radio at a specified broadcast frequency. For one embodiment, the Shell also transmits meta-data using a Radio Data System ("RDS") sub-frequency, thus enabling meta-data to be displayed on the radio liquid crystal display ("LCD").

For one embodiment of the invention, the Nest includes a unit having a hard disk for storage of songs, an audio/video encoding and decoding platform, an on-screen display component, optional front panel navigation buttons and scroll wheel, an LCD panel, and various external interfaces including audio/video jacks, USB, Firewire, and power jacks. In addition, the main Nest unit includes four sockets that comprise a docking station for four Eggs. For one embodiment, the sockets have leads to both re-charge the Eggs and to transfer songs to and from the Eggs. The Nest receives analog audio and video from the listener's receiver, and encodes both the audio and video signal in real-time. The video portion of the signal is analyzed in order to extract artist name, song name, and label and year from the video broadcast for categorization purposes. For one embodiment, the analog audio is encoded separately from the video.

Thus, a hand-held music player is described for use in conjunction with radios. The hand-held music player includes a casing, a receiver socket on the casing through which digital audio data is received, a digital-to-analog audio converter housed within the casing, a first transfer socket on the casing through which a song is transferred to a radio transmitter, a second transfer socket on the casing through which meta-data for the song is transferred to the radio transmitter, and a dial on the casing for selecting a song for playback.

Another hand-held music player for use in conjunction with radios is described. The hand-held music player includes a casing, a receiver socket on the casing through which digital audio data is received, a digital-to-analog audio converter housed within the casing, a radio transmitter for transmitting a song, an RDS transmitter for transmitting meta-data for the song, and a dial on the casing for selecting a song for playback.

A hand-held video player for use in conjunction with televisions is described. The hand-held music player includes a casing, a receiver socket on the casing through which digital video data is received, a digital-to-analog video converter housed within the casing, a first transfer socket on the casing through which a video is transferred to a television transmitter, a second transfer socket on the casing through which meta-data for the video is transferred to the television transmitter, and a dial on the casing for selecting a video for playback.

A further hand-held video player for use in conjunction with televisions is described. The hand-held video player includes a casing, a receiver socket on the casing through which digital video data is received, a digital-to-analog video converter housed within the casing, a television transmitter for transmitting a video and meta-data for the video, and a dial on the casing for selecting a video for playback.

A hand-held container for audio with associated meta-data is described. The hand-held container includes a casing, a memory housed within the casing storing digital audio with associated meta-data, a digital-to-analog audio converter housed within the casing, and a transfer socket on the casing through which a song and meta-data associated therewith is transferred to a radio transmitter.

A hand-held container for video with associated meta-data is described. The hand-held container for video includes a casing, a memory housed within the casing storing digital video with associated meta-data, a digital-to-analog video converter housed within the casing, and a transfer socket on the casing through which a video and meta-data associated therewith is transferred to a television transmitter.

A digital music library builder is described that includes a casing, a receiver socket on the casing through which analog audio is received, an analog-to-digital converter housed within the casing for converting analog audio into digital audio, a meta-data identifier housed within the casing for identifying meta-data for a song, and a database manager housed within the casing for associating the identified meta-data with the song within a digital music library.

A method is described for transferring audio with associated meta-data. The method includes converting digital audio to analog audio, and transferring an analog song and meta-data associated therewith to a radio transmitter.

A method is described for building a digital music library builder. The method includes receiving analog audio, converting the analog audio to digital audio, identifying meta-data for a song, and associating the identified meta-data with the song within a digital music library.

A computer-readable storage medium is described storing program code for causing a device to perform the steps of converting digital audio to analog audio, and transmitting an analog song and meta-data associated therewith to a radio transmitter.

A computer-readable storage medium is described storing program code for causing a device to perform the steps of receiving analog audio, converting the analog audio to digital audio, identifying meta-data for a song, and associating the identified meta-data with the song, within a digital music library.

A device is described for transferring audio to a radio transmitter. The device includes a mini-jack through which an analog song is transferred to an FM radio transmitter for broadcast at a specific FM frequency, and a USB socket through which digital meta-data for the song is transferred to a radio data system (RDS), which is a sub-carrier of the specific FM frequency.

A method is described for transferring audio to a radio transmitter. The method includes transferring an analog song to an FM radio transmitter for broadcast at a specific FM frequency, and transferring digital meta-data for the song to a radio data system (RDS), which is a sub-carrier of the specific FM frequency.

A computer-readable storage medium is described storing program code for causing a device to perform the steps of transferring an analog song to an FM radio transmitter for broadcast at a specific FM frequency, and transferring digital meta-data for the song to a radio data system (RDS), which is a sub-carrier of the specific FM frequency.

Other features and advantages of embodiments of the invention will be apparent from the accompanying drawings and from the detailed description that follows.

BRIEF DESCRIPTION OF THE DRAWINGS

Embodiments of the present invention are illustrated by way of example and not limitation in the figures for the accompanying drawings, in which like references indicate similar elements and in which.

DETAILED DESCRIPTION

Embodiments of the present invention enable a listener to automatically import songs recorded from a broadcast music station into his digital music library, along with the songs' meta-data required for indexing his library. A listener, with practically no effort, can automatically build a large digital music library with tens of thousands of his choice of songs, all properly indexed for search and retrieval.

Moreover, an additional feature of an embodiment of the present invention enables the listener to select which songs from among those broadcast on the music stations are to be imported into his library, based on one or more of genre, song title, artist, album, length of song, and other criteria.

Embodiments of the present invention concern a method and system for automatically building digital music libraries, from music channels broadcast through cable and satellite stations. For one embodiment, broadcast songs are recorded into a digital music library along with meta-data necessary for indexing and accessing each individual song, and for display while the songs are being played. The digital music library generated from the broadcast music serves as a large library of individual songs with full search and access capability.

Figure 1:
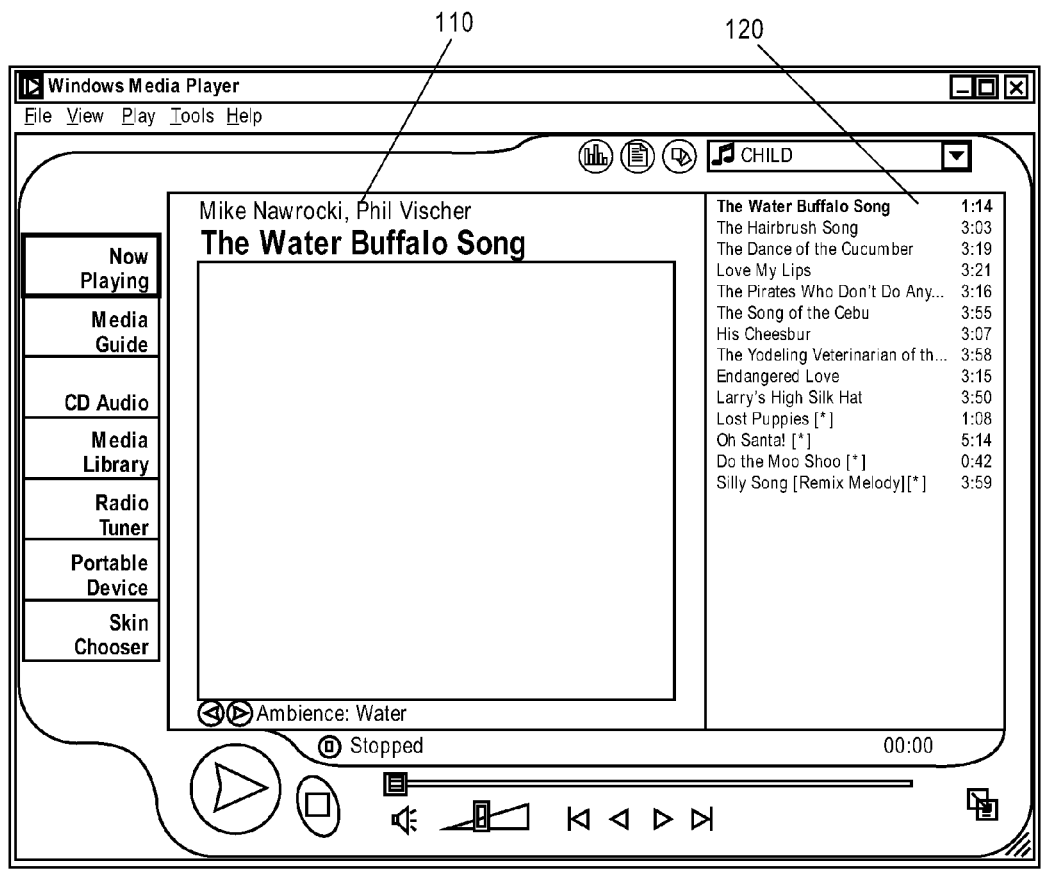
FIG. 1 is an illustration of a prior art user interface for a Windows media player, indicating meta data and an index for accessing individual songs displayed.
Figure 2:
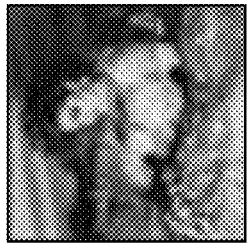
FIG. 2 is a sample video frame displaying meta-data for a song for processing in accordance with an embodiment of the present invention.

Reference is now made to FIG. 2, which is a sample video frame 210 displaying meta-data for a song, for processing in accordance with an embodiment of the present invention. Video frame 210 is broadcast by satellite to listeners of the "Music Choice" station. Video frame 210 is typically displayed on a listener's television while live music is being broadcast. As shown in FIG. 2, the listener has selected a genre for songs of the 80's, and is currently listening to a song entitled "Like a Virgin" by the artist "Madonna," from an album entitled "Like a Virgin." The various descriptive data associated with a song is referred to as "meta-data;" i.e., descriptive data about the digital audio data itself.

Embodiments of the present invention provide a system that enables the listener to automatically digitally record each broadcast song into a digital music library and index each song according to genre, song title, artist and album title, as described below. Additionally, embodiments of the present invention enable the listener to filter songs to be automatically recorded by specifying, inter alia, a genre, song title, or artist, instead of recording all of the broadcast songs. The listener need not be present while the system is in operation. Embodiments of the present invention enable automatic generation of large libraries of songs.

Figure 3:
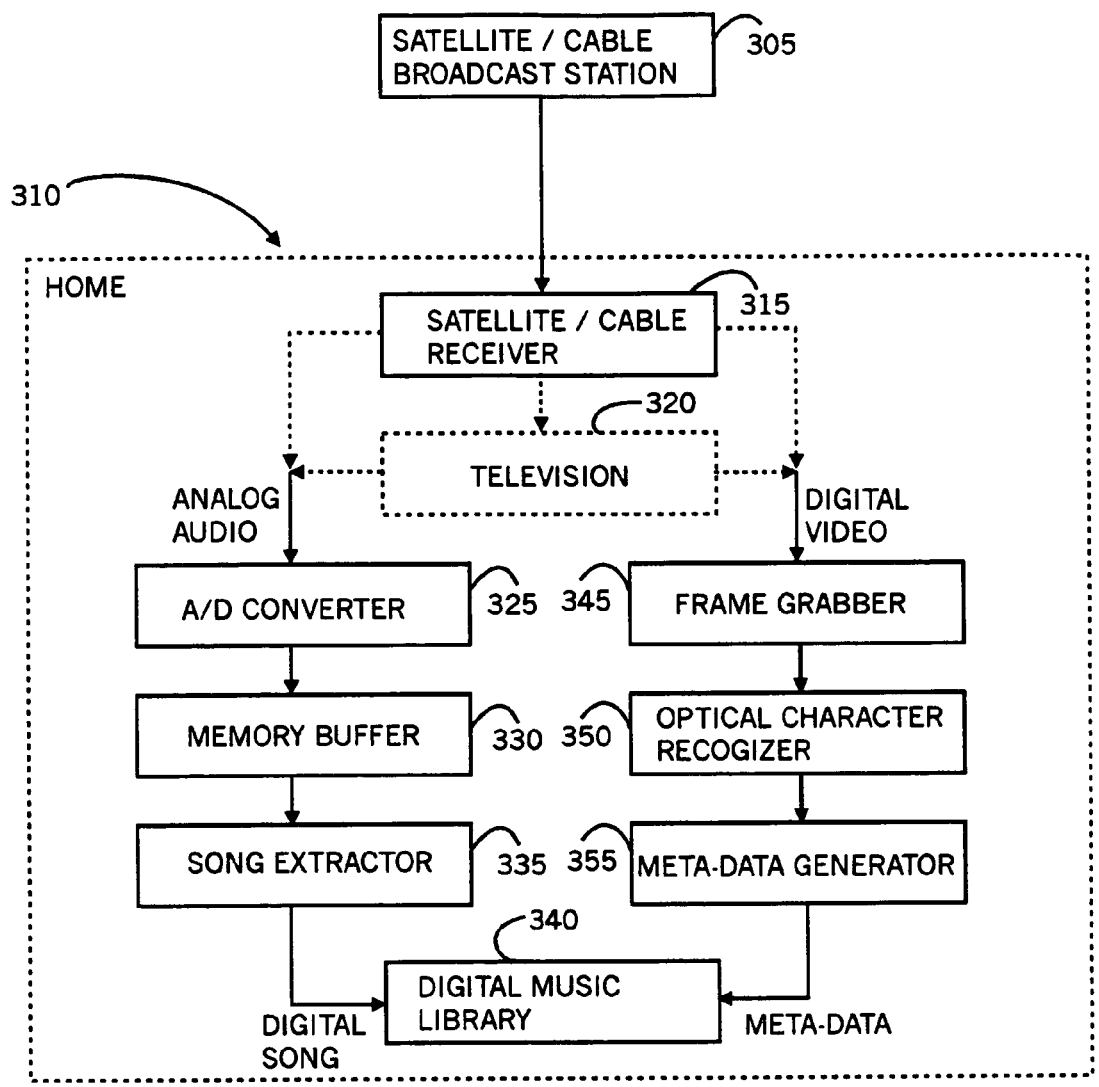
FIG. 3 is a simplified block diagram of a digital music library builder, or "Nest," in accordance with an embodiment of the present invention.

Reference is now made to FIG. 3, which is a simplified block diagram of a digital music library builder in accordance with an embodiment of the present invention. Shown in FIG. 3 is a broadcast station 305 broadcasting cable or satellite entertainment to a home 310. The broadcast entertainment is received within home 310 by a satellite or cable receiver 315 and played to a home viewer though his television 320 or other display device.

The audio output of satellite or cable receiver 315 is converted from analog to digital by an A/D converter 325. The converted digital audio is written to a memory buffer 330. If cable or satellite receiver 315 includes an optical or coaxial connection for audio out, then digital audio can be extracted directly without the need for A/D converter 325.

A song extractor 335 analyzes the digital audio and marks the beginnings and ends of individual songs. For one embodiment, song extractor 335 filters out non-musical portions from the digital audio, such as pure speech, and compensates for overlapping the end of one song with the beginning of a next song. Each such song marked by song extractor 335 is written to a digital music library 340, which is a storage device such as a hard drive, and subsequently flushed from memory buffer 330.

A video frame grabber 345 captures a video frame being displayed on television 320, such as video frame 210 illustrated in FIG. 2. An optical character recognizer 350 extracts characters from the video frame, such as the characters in video frame 210. A meta-data generator 355 identifies meta-data associated with a current song, within the extracted characters, such as a genre, song title, artist name, and album title within video frame 210. The meta-data identified by meta-data generator 355 is then written to digital music library 340 and linked to the corresponding song.

The overall process through which meta-data is extracted from the video portion of the audio/video broadcast is as follows. A number of frames are captured from the video broadcast by station 305—for one embodiment, between 10 and 20 frames per song. The captured frames are processed using image processing algorithms so as to create a clear image of a desired region of the screen. The clarified image is cropped according to a pre-determined template, which specifies the location of relevant data on the screen. For one embodiment, such template is generated by analyzing screens from multiple songs so as to recognize a pattern. For one embodiment, the resulting cropped image is transformed into a two-tone black and white image. The black and white image is processed through optical character recognizer 350 and relevant meta-data is extracted by meta-data extractor 355.

For one embodiment, extracted meta-data is verified with an internal CD database, such as the Gracenote® database, to ensure accuracy. Such an internal CD database is also used for an embodiment to determine meta-data, in circumstances where the extracted meta-data is incomplete or inaccurate, by matching the extracted meta-data to entries in the database that are close matches.

As indicated in FIG. 3 by use of dashed lines, the audio signal and video frame may be extracted from television 320 instead of from cable or satellite receiver 315.

Songs broadcast by station 305 can be selectively imported into digital music library 340, filtered according to meta-data. Criteria based on one or more meta-data including, inter alia, genre, song title, artist name, album title, and length of song, can be used to filter songs to be imported from among all of the broadcast songs. For one embodiment, a memory buffer is used to record a song while a determination is being made whether or not to filter the song.

For one embodiment, songs already included within digital music library 340 are not overwritten unless the listener expressly instructs the system to overwrite.

Figure 4A:
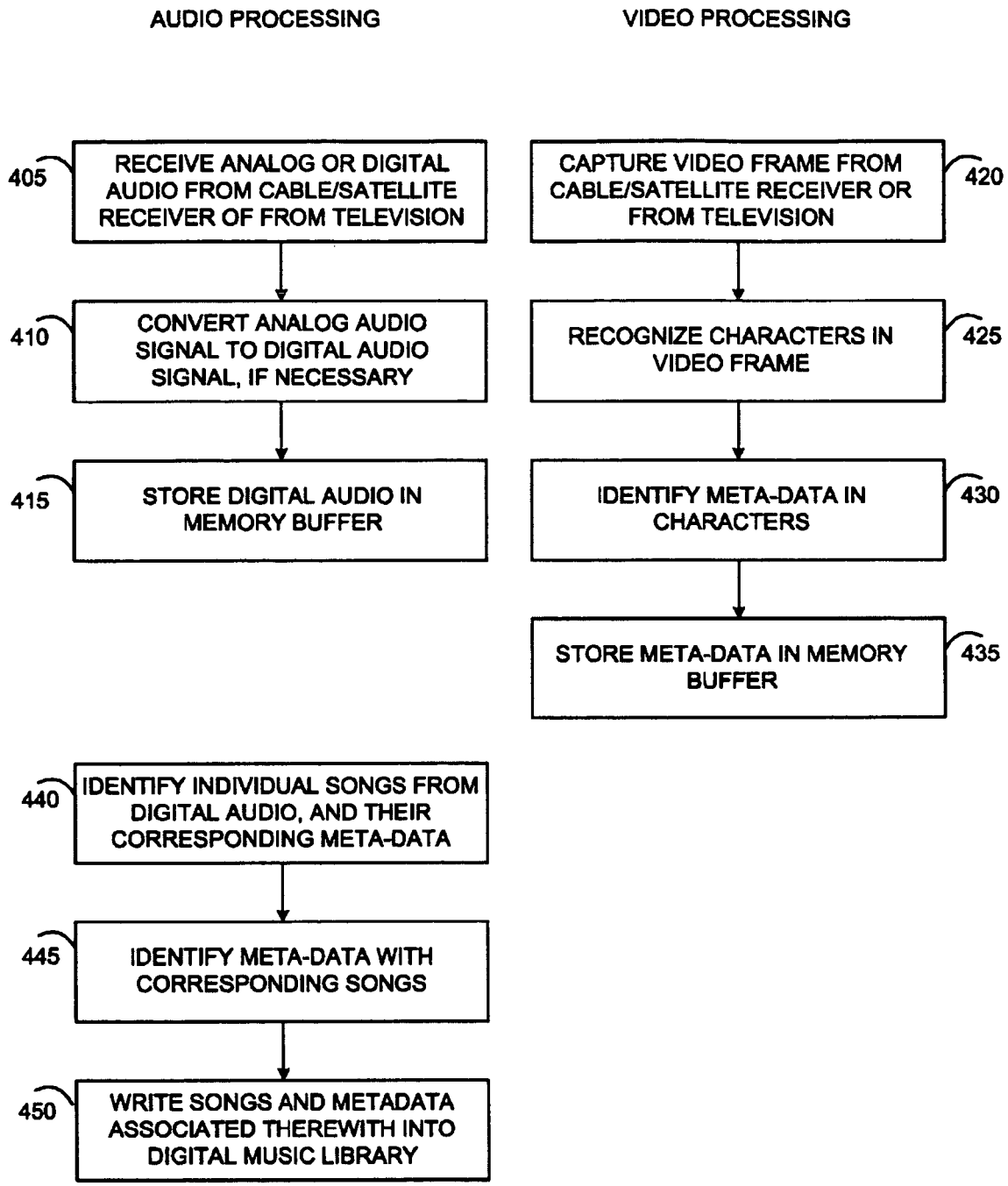
FIG. 4A is a simplified operational flow chart for building a digital music library in accordance with an embodiment of the present invention.

Reference is now made to FIG. 4A, which is a simplified operational flow chart for building a digital music library in accordance with an embodiment of the present invention. At operation 405 an analog audio signal or a digital audio signal is received from a cable receiver, a satellite receiver, or from a television. At operation 410, the analog signal is converted to digital audio if an analog signal was received at operation 405. The digital audio is stored in a memory buffer at operation 415.

At operation 420, a video frame is captured from a cable receiver, a satellite receiver, or from a television. At operation 425, character recognition is applied to recognize characters in the captured video frame. At operation 430 meta-data is identified from the recognized characters. For one embodiment, a template for the captured video frame is used as an aid in operations 425 and 430. For example, a template corresponding to video frame 210 from FIG. 2 may indicate an area of the image in which relevant meta-data typically appears. At operation 435 the identified meta-data is stored in a memory buffer.

At operation 440 the digital audio stored in the memory buffer is analyzed to identify individual songs, as described in more detail with reference to FIG. 4B. At operation 445 meta-data stored in the memory buffer is identified as being associated with corresponding individual songs. At operation 450 individual songs and their associated meta-data are written to a digital music library.

Due to interlacing on the television screen, it may be necessary to capture more than one video frame at operation 420 in order to be able to extract the meta-data for the song being broadcast. Multiple frames are preferably averaged in order to enhance the appearance of characters prior to recognition operation 425.

Alternatively, to enhance characters prior to recognition operation 425, the luminance component of the one or more color video frames can be extracted. Extraction of luminance serves to remove color burst noise that degrades performance of optical character recognition.

The operations in FIG. 4 may be performed in a different order than as numbered in FIG. 4A. For example, operations 405, 410, and 415 for the audio processing may be performed before or after or simultaneous with operations 420, 425, 430, and 435 for the video processing.

Figure 4B:
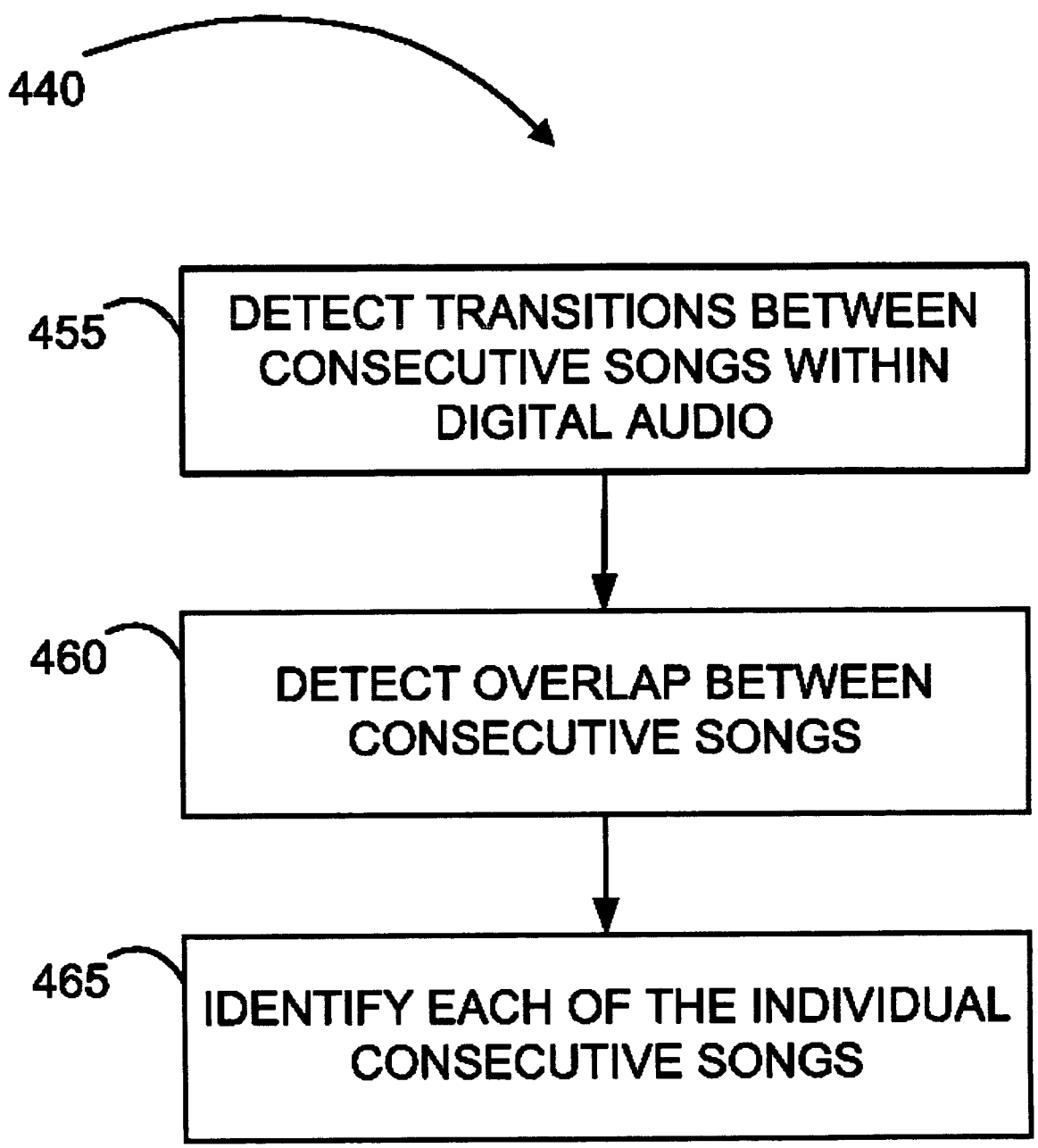
FIG. 4B is a simplified flowchart of a signal processing method for identifying individual songs from within a digital audio segment of music recorded from a cable or satellite receiver, or from a television, in accordance with an embodiment of the present invention.

Reference is now made to FIG. 4B, which is a simplified flowchart of a signal processing method for identifying individual songs from within a digital audio segment of music recorded from a cable receiver, a satellite receiver, or from a television, corresponding to operation 440 in FIG. 4A. The recorded digital audio includes a signal of samples, s(n), corresponding to a sequence of songs. At operation 455, transitions are detected between a first song, $s_1(n)$, and a second song, $s_2(n)$, within the recorded signal s(n). The songs broadcast from the cable receiver, the satellite receiver, or from the television generally overlap and fade in and out, thus making it difficult to separate them. If the broadcast songs do not overlap, then transitions are identified by short intervals of quiet, or background noise. But when the songs overlap, such quiet intervals may not exist. Thus automatic detection of transitions within broadcast songs, as at operation 455, is challenging.

When the data stream s(n) exhibits significant energy reduction between songs, such as is typical for fade in and fade out, a characteristic measurement such as $$x(n) = \sum_{k=0}^{N-1} |s(n-k)|$$

is minimized during song transitions. Thus song separation can be based on a threshold value for x(n). Such a threshold can be fine tuned by adjusting it dynamically based on the values of x(n).

For data streams where energy reduction between songs is not significant, an alternate approach is to use a characteristic measurement such as $$x(n) = \max_{0 \le i < M} C(V_i(n), V_i(n-1)),$$

where C(v,w) is a measure of correlation between two vectors v and w; and where $v_i(n)$ is a vector that captures frequency-based properties of the samples s(n), s(n−1), . . . , s(n−N+1), for frequencies within an $i^{th}$ band, or range, of frequencies. As above, song separation can be based on a threshold value for x(n). The motivation for this alternate approach is that each song generally has its own characteristic resonances in its rhythm and melody. Thus during a single song the vectors $v_i(n)$ tend to be correlated, and after a transition they tend to change significantly.

The two algorithms described above for performing operation 455 represent two different approaches to identifying transitions between songs, and other viable algorithms may also be used.

At operation 460 an interval of overlap between two songs is detected. An algorithm for detecting transitions may be used to detect start and stop of overlap. As above, other viable signal processing algorithms may also be used for performing operation 460.

At operation 465 individual songs $s_1(n)$ and $s_2(n)$ are recovered from the combined signal s(n), using the overlap detected at operation 460 for one embodiment. An algorithm for recovering $s_1(n)$ is to use the values of $s_1(n)$ prior to the overlap interval, namely s(n), to predict the values of $s_1(n)$ during the overlap interval. Denoting the predictor of $s_1(n)$ by $\hat{S}_1(n)$, the difference $s_1(n)-\hat{S}_1(n)$ is used as a predictor $\hat{S}_2(n)$ to estimate the values of $s_2(n)$ during the overlap interval. The value of $s_2(n)$ after the overlap interval, namely s(n), is used to correct the estimator $\hat{S}_2(n)$, which in turn feeds back to correct the estimator $\hat{S}_1(n)$. By iterating prediction and feedback, converged estimators $\hat{S}_1(n)$ and $\hat{S}_2(n)$ are generally obtained. As above, other viable signal processing algorithms may also be used for performing operation 465.

For an alternative embodiment of the present invention, meta-data for a song is determined directly from the digital audio data by looking up the song using a database of "fingerprints" for known songs. A fingerprint of a song is a relatively small pattern of bits that captures perceptual qualities of the song. The fingerprint of a song can be computed from digital audio samples of the song. For one embodiment, a comprehensive database is generated, including fingerprints of a large number of known songs, together with the known meta-data associated with them. Then, to determine meta-data associated with an unknown song, the fingerprint of the unknown song is computed and compared with the fingerprints within the database to find a best match. The entry in the database whose fingerprint best matches that of the unknown song generally contains the sought for meta-data associated with the unknown song.

For this alternative embodiment, operations 425, 430, and 435 in FIG. 4A are not required. For another embodiment, operations 425, 430, and 435 are performed, and a database of fingerprints is used to correct possible errors that may occur in automatic recognition of meta-data from video frames.

The present invention is embodied in a programmable device, referred to herein as a "Nest," that can interface with computers, with MP3 players and other digital music players, and with other electronic devices that include MP3 players or other digital music players therewithin, including, inter alia, cell phones, PDAs, home network appliances, and Internet appliances. For a first embodiment, the Nest is coupled to satellite/cable receiver 315 (FIG. 3). For a second embodiment, the Nest is coupled to television 320. For a third embodiment, the Nest is coupled to various external components via a USB and a Firewire connection.

For all embodiments, the memory storing digital music library 340 can be either a large hard disk situated within the Nest itself, or one or more smaller removable memory units such as compact disks and memory cards, or a combination of hard disk and removable memory. The advantage of a large hard disk is that the listener's music library is consolidated into a single library that can be searched and accessed in its entirety. The advantage of removable memory units, such as compact disks, is that the listener can insert the disks into portable players such as MP3 players. Assuming that 40 songs on average require 128 MB of data and include one and a half hour's worth of listening, a large 80 GB hard disk can hold a library of approximately 25,600 songs. A 640 MB compact disk can hold approximately 200 songs, or about 7½ hours worth of listening.

For one embodiment of the present invention, a Nest includes one or more exchange ports, also referred to herein as "cradles," through which one or more hand-held digital music players, referred to herein as "Eggs," can be connected to the Nest, for loading songs from a digital music library stored on the Nest thereto. Such exchange ports may be circular or oval ports into which Eggs in the shape of film canisters are inserted. Eggs may be "charged up" with songs while they are "plugged into" the Nest.

For one embodiment of the present invention, an Egg can be connected to an adaptor, referred to herein as a "Shell," that includes an FM/RF transmitter. Using the Shell, songs stored in an Egg can be played on a radio, such as an audio deck within an automobile. The shell receives analog audio out from the Egg and broadcasts the audio to an FM radio at a user-selectable frequency from among a list of frequencies. In addition, the Shell transmits meta-data concurrently with a song through a Radio Data System (RDS) transmission. Alternatively, instead of using a user-selectable frequency, the Egg may transmit to the Shell a list of one or more free FM frequencies.

Figure 5:
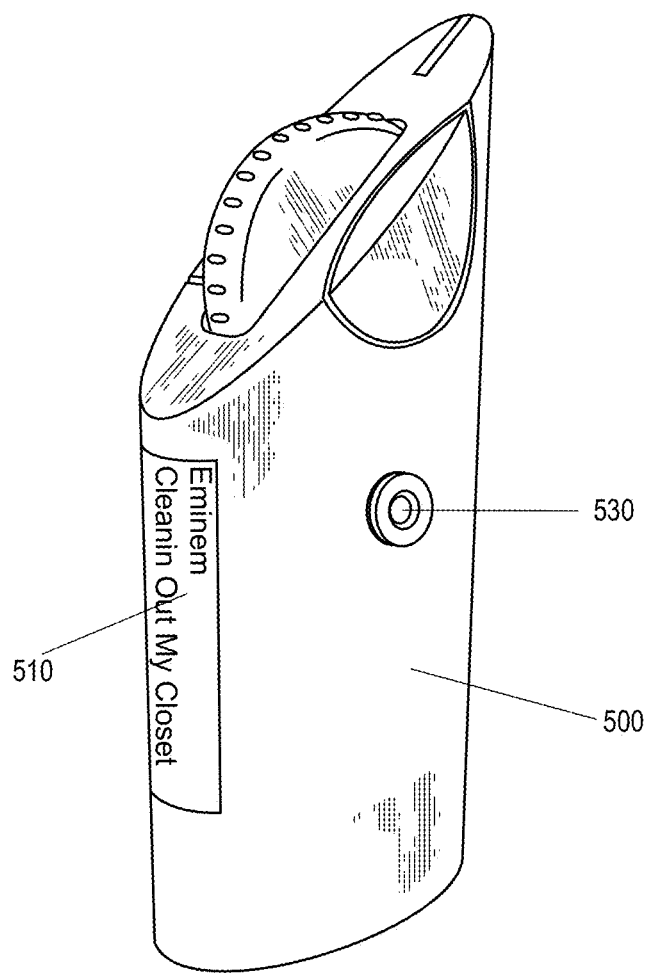
FIG. 5 is a simplified perspective view of a music player, or "Egg," in accordance with an embodiment of the present invention.

Reference is now made to FIG. 5, which is a simplified perspective view of a music player, or "Egg," in accordance with an embodiment of the present invention. Shown in FIG. 5 is a hand-held Egg 500 including a display 510 for viewing meta-data for a song being played. Egg 500 is loaded with songs from a Nest and serves as a player. Also shown in FIG. 5 is a jog dial 520 and a mini-jack 530 for inserting a headphone.

Figure 6A:
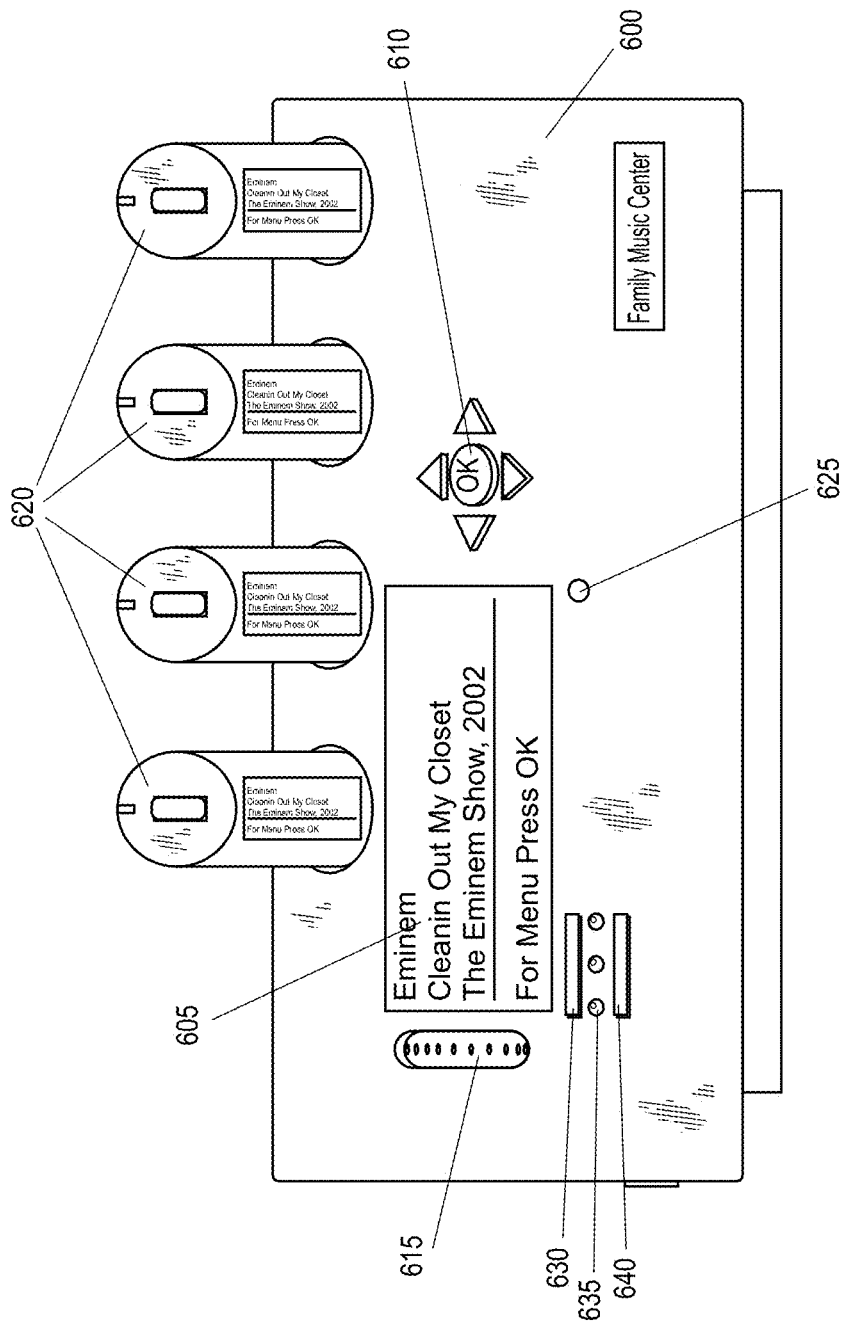
FIGS. 6A-6G are simplified perspective views of a Nest in accordance with an embodiment of the present invention.
Figure 6B:
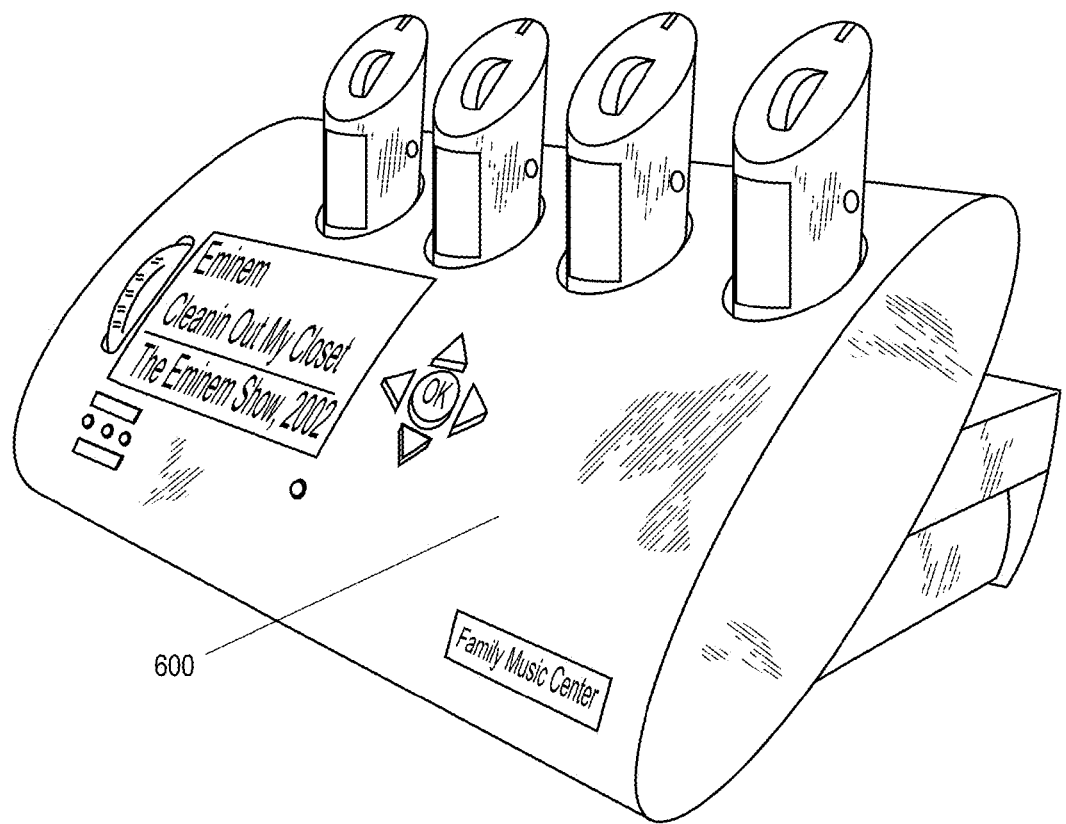
Figure 6C:
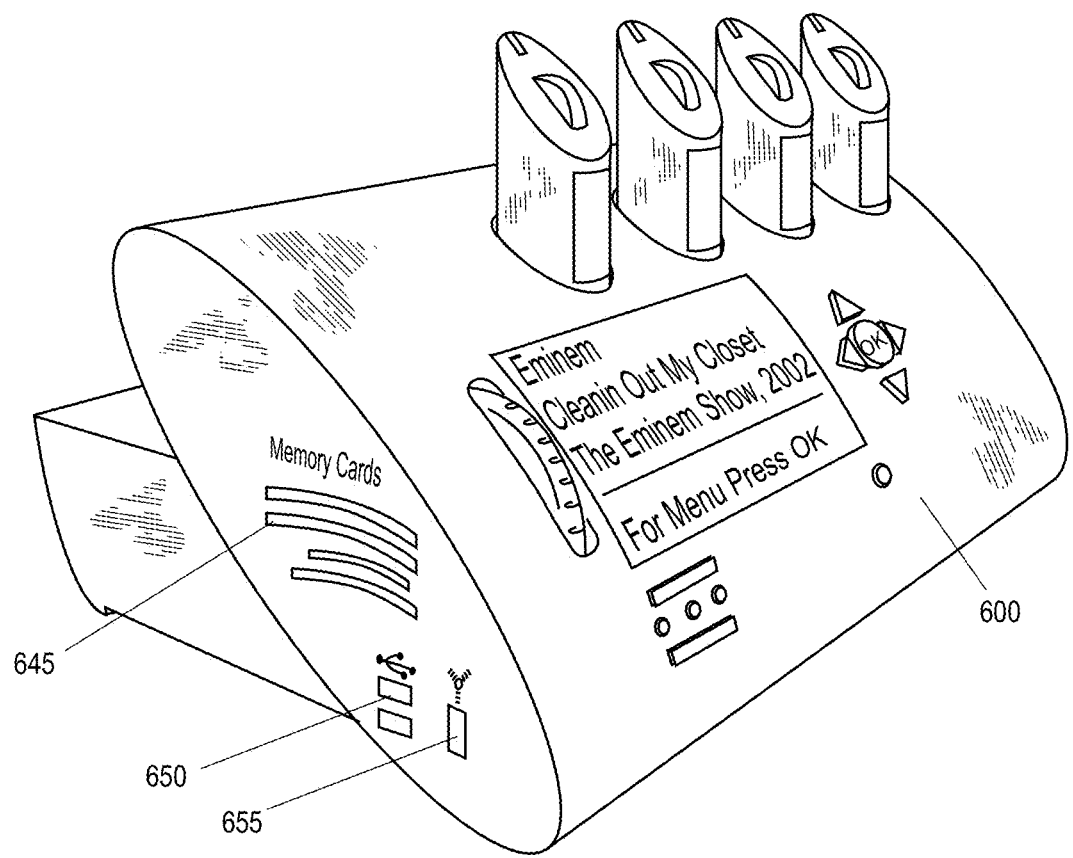
Figure 6D:
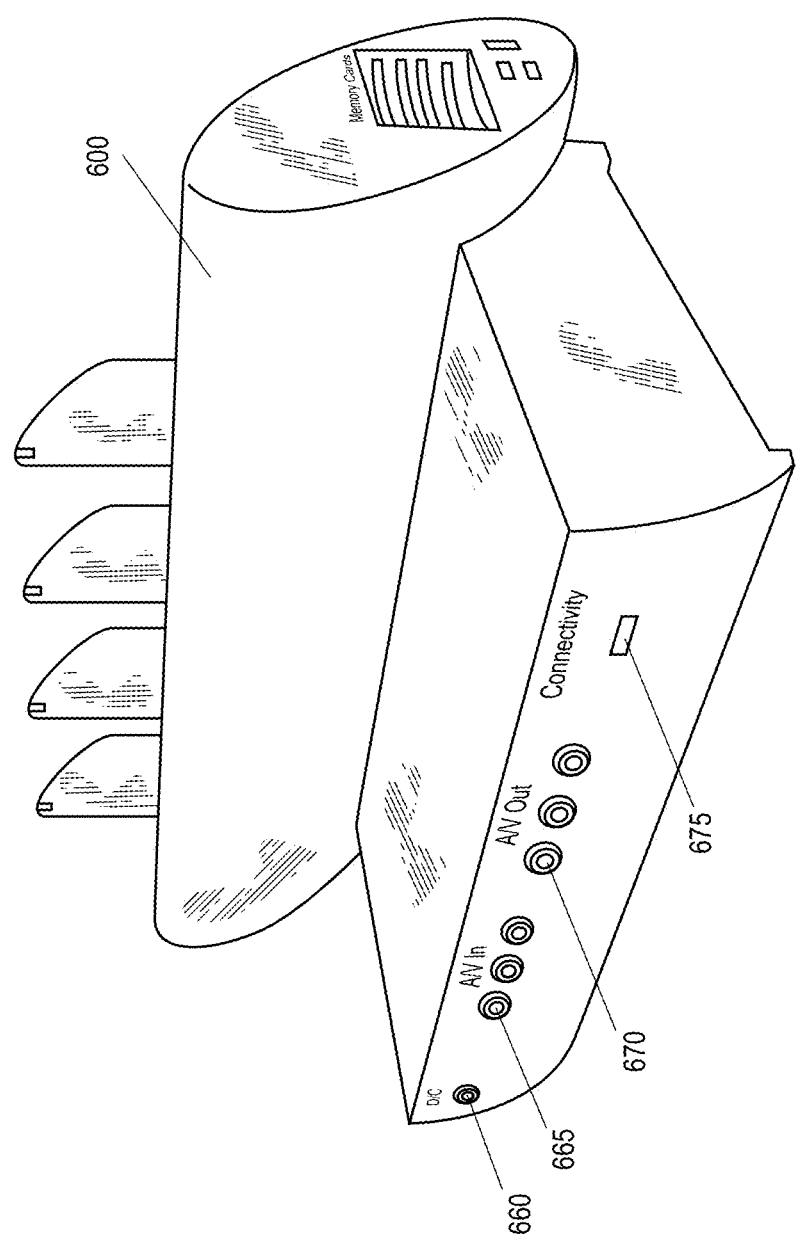
Figure 6E:
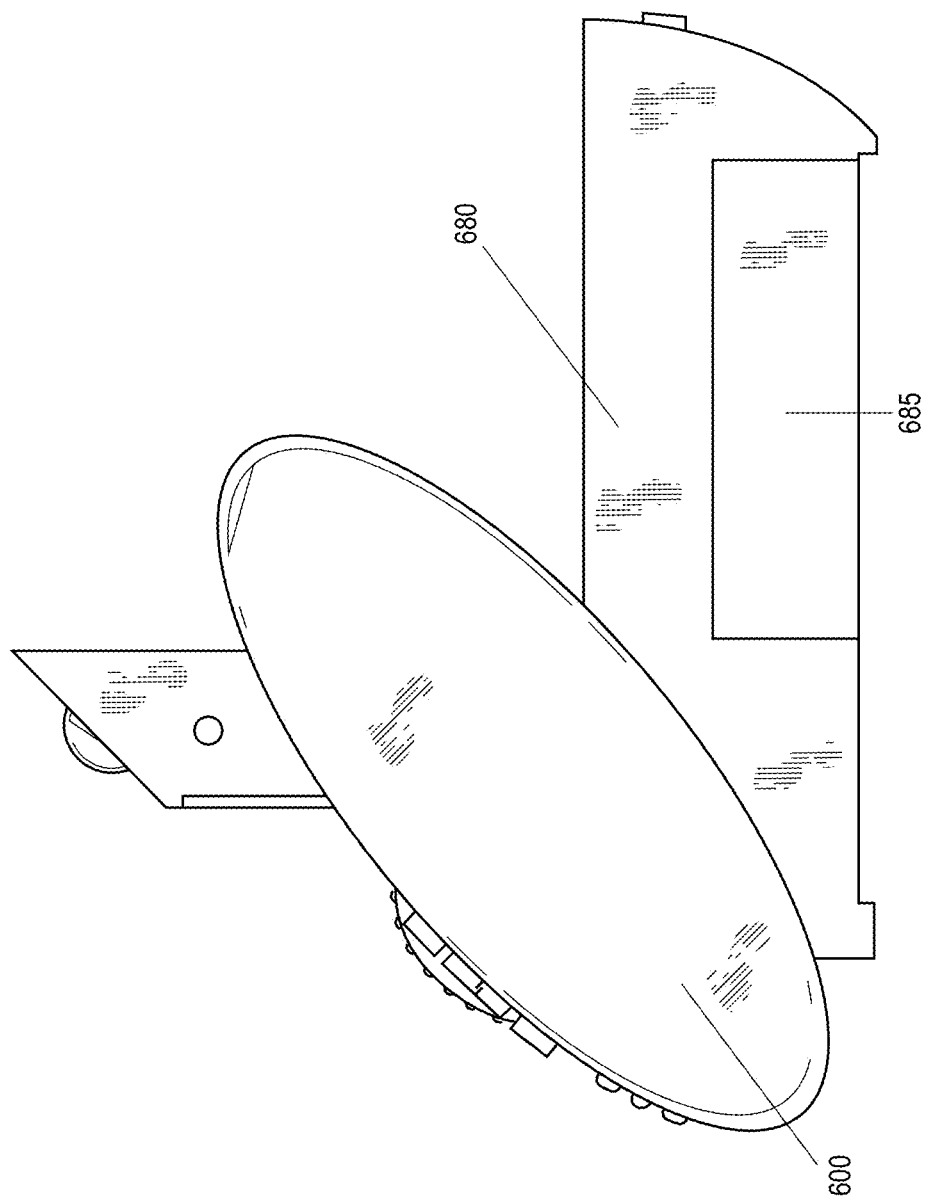
Figure 6F:
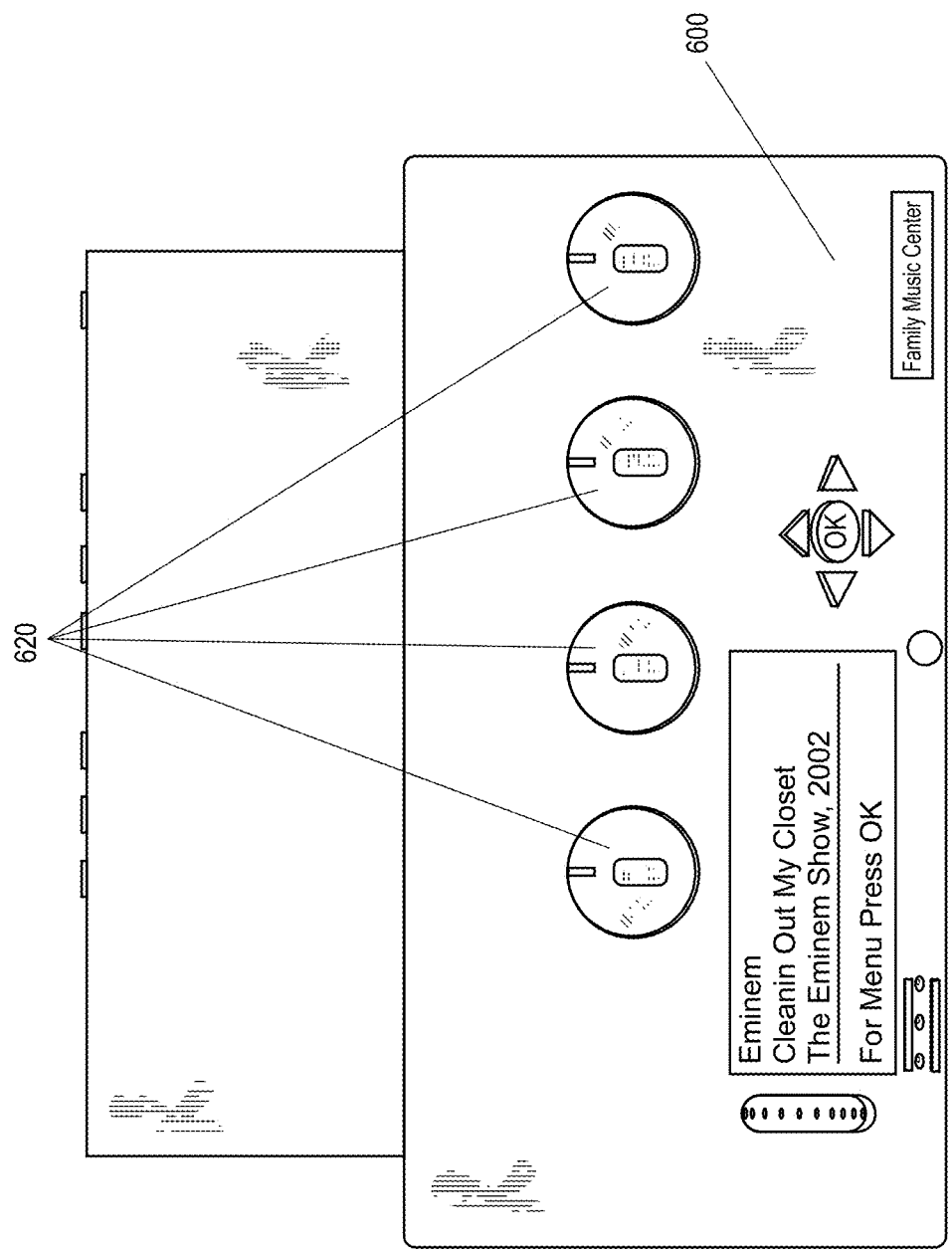
Figure 6G:
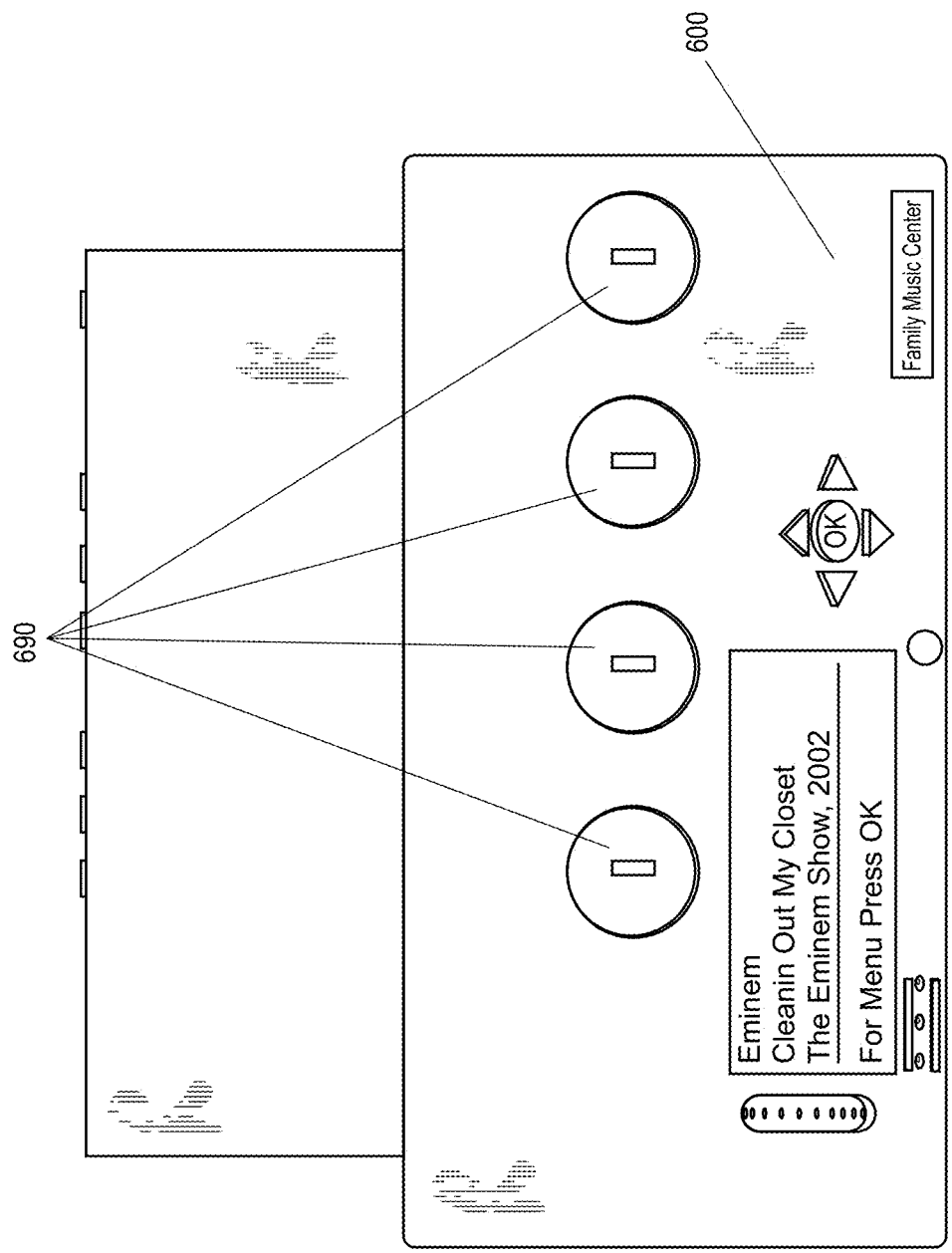

Reference is now made to FIGS. 6A-6G, which are simplified perspective views of a Nest in accordance with an embodiment of the present invention. FIG. 6A is a front view of a Nest 600, including a user interface display 605 with buttons 610 and scroll wheel 615 for navigation, and including slots for four Eggs 620. Also shown in FIG. 6A is a mini-jack 625 for inserting a headphone, an on/off button 630, green and yellow LEDs 635 and a record button 640. FIGS. 6B, 6C, and 6D are side views of Nest 600. FIG. 6C shows a side of Nest 600 having slots 645 for memory cards, USB sockets 650 for connecting foreign MP3 players to the Nest, and an IEEE 1394 socket 655 for connecting IEEE 1394 devices to the Nest. FIG. 6D shows the back of Nest 600 with a slot 660 for a DC power supply, slots 665 for audio and video in, slots 670 for audio and video out, and a connectivity slot 675. Connectivity slot 675 is preferably used for Ethernet support, Bluetooth support, and 802.11 based connectivity. FIG. 6E is a view from the right of Nest 600, indicating a base support 680 for the Nest and a removable disk drive 685. FIGS. 6F and 6G are views from the top of Nest 600 with and without Eggs 620 inserted into slots 690, respectively.

Figure 7A:
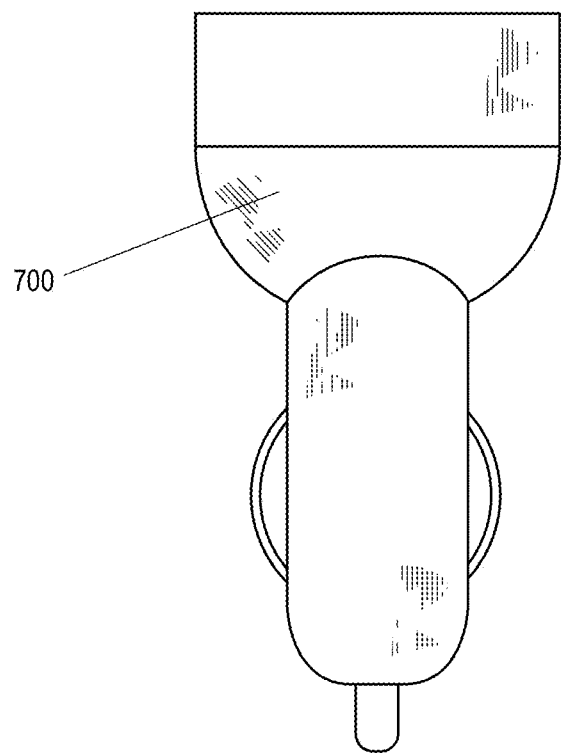
FIGS. 7A and 7B are simplified perspective views of an adaptor, or "Shell," in accordance with an embodiment of the present invention.
Figure 7B:
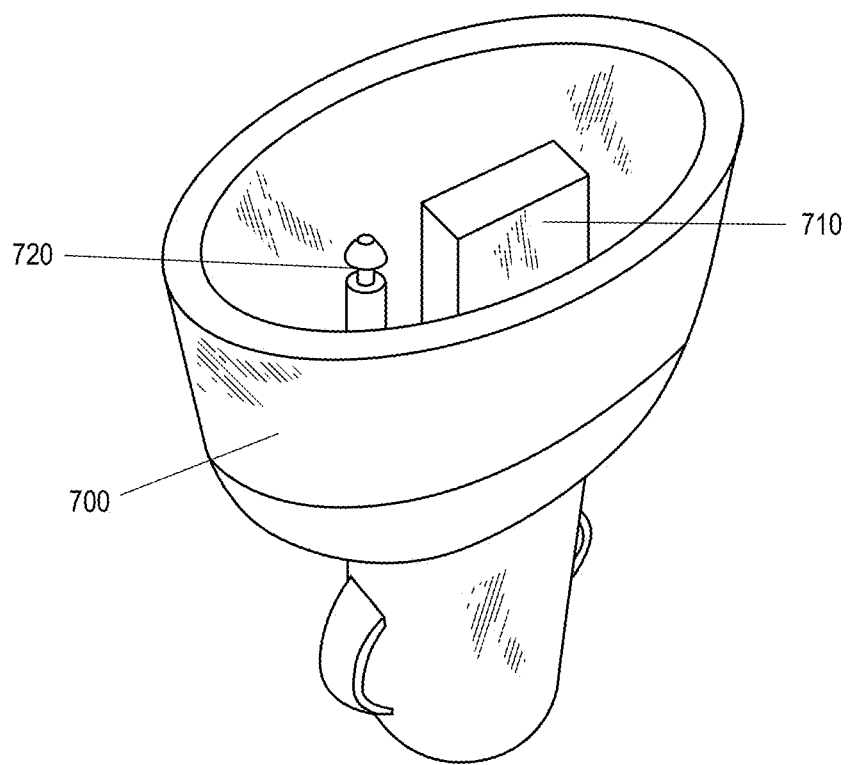

Reference is now made to FIGS. 7A and 7B, which are simplified perspective views of an adaptor, or "Shell" 700 in accordance with an embodiment of the present invention. Shell 700 is used to broadcast analog audio played by an Egg to a radio, such as an audio deck in an automobile. FIG. 7A is a front view of the Shell. FIG. 7B is a top view of Shell 700, indicating a male USB connector 710 and a male RCA audio connector 720.

Figure 8A:
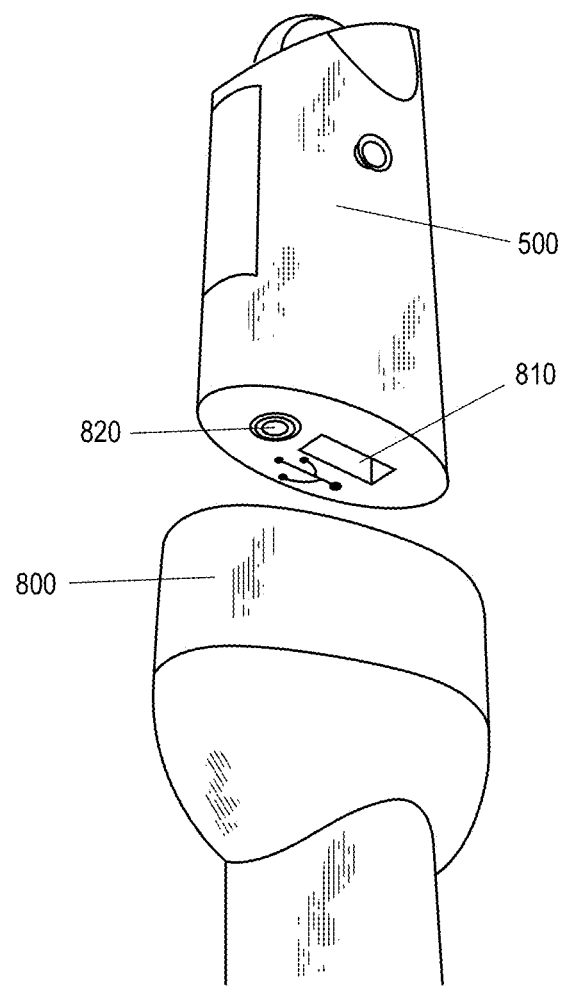
FIGS. 8A-8F are simplified perspective views of an Egg and Shell combination in accordance with an embodiment of the present invention.
Figure 8B:
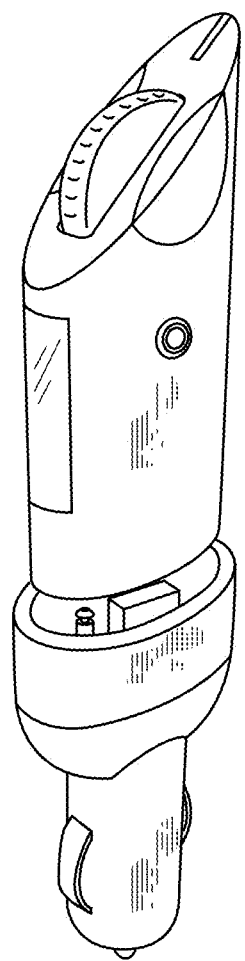
Figure 8C:
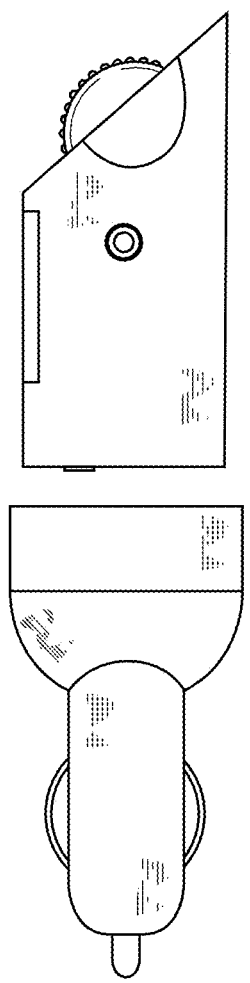
Figure 8D:
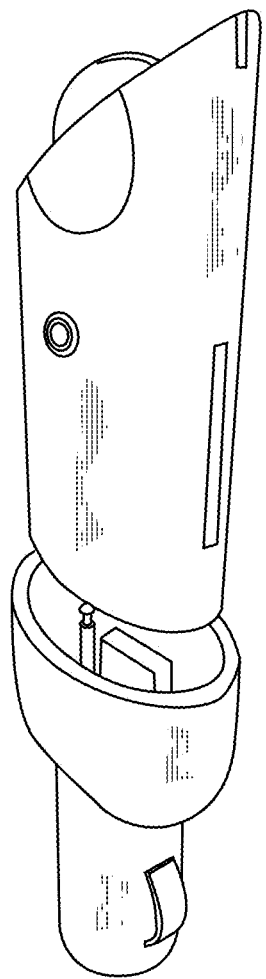
Figure 8E:
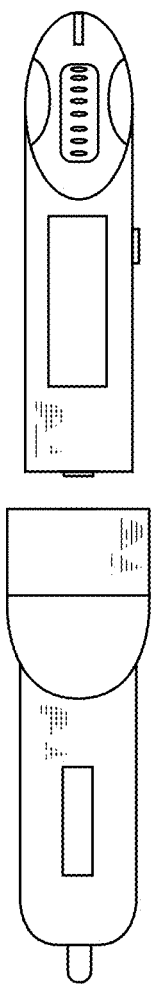
Figure 8F:
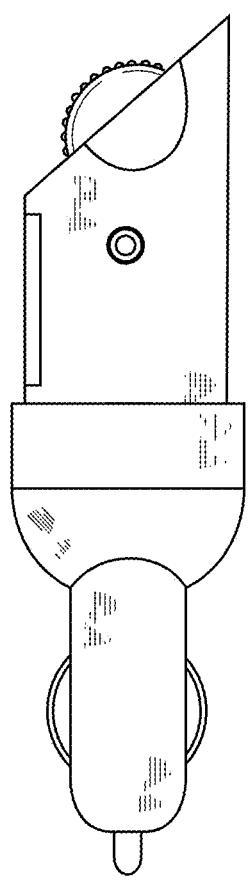

Reference is now made to FIGS. 8A-8F, which are simplified perspective views of an Egg and Shell combination in accordance with an embodiment of the present invention. Shown in FIG. 8A is a Shell 800 and an Egg 500. Underneath Egg 500 is a female USB connector 810 and a female audio/video RCA connector 820.

A typical usage scenario for a Nest is as follows. A listener sets his cable or satellite receiver box to a specific music channel—for one embodiment, from a commercial-free radio station such as The Music Choice®—and activates the Nest to capture songs from the music channel. The Nest automatically creates a digital music library and imports the broadcast songs therein. Thereafter, the listener plugs an Egg into the Nest and loads selected songs from the music library onto the Egg. If the Nest is connected to the listener's speaker system, then the listener may also pipe music from the Nest into speakers in various rooms. If the Nest is connected to a home network, the listener may stream audio to a computer that is authorized to work with the Nest.

For one embodiment of the present invention, Nest 600 supports two types of I/O interfaces; namely, those inherently supported by the Nest, and those supported when connected to a network. Specifically, the I/O interfaces include one or more of the following:

TABLE I

Nest Hardware I/O Interfaces

| Hardware Interface | Description |
| --- | --- |
| Four male USB 2.0 On-The-Go (OTG) connectors 690 (FIG. 6G) | Inside the Egg cradle, as illustrated in FIG. 6G. The USB 2.0 OTG connectors need not work simultaneously and, as such, they can be implemented in a hub or switch configuration. The connectors need not be OTG connectors, since the Nest can act as a USB 2.0 host, thus obviating the need for OTG support. |
| Four audio/video male connectors | (Optional) Adjacent to the USB 2.0 OTG connectors in the Egg cradles. The A/V connectors are used for connecting analog audio and analog video leads from the Eggs to the Nest. For one embodiment, Egg A/V connectors support multi-system video, including PAL, NTSC and SECAM. |
| Two sets of analog left and right audio in and analog video in, or s-video in connectors 665 (FIG. 6D) | One set located on the front of the Nest, and one set located on the rear of the Nest. For one embodiment, these connectors are high quality female RCA plug connectors. The front set of connectors is used to connect auxiliary audio devices, such as a CD player, in order to add content into the Nest. The rear set of connectors is used to connect analog audio and analog video outs from a digital cable or DBS box to the Nest for one embodiment. |
| Left and right analog audio out and analog video out, or s-video out connectors 670 (FIG. 6D) | Used to connect to a television set in order to provide both pass-through audio and video to the television set from the digital cable or DBS box. For one embodiment, these connectors are high quality female RCA plug connectors. For one embodiment, the Nest applies an overlay, over the incoming video, which has a menuing graphical user interface for enabling a consumer to interact with the Nest and perform on-screen menuing functions using a remote control. |
| Infrared receiver 625 (FIG. 6A) | Shown in FIG. 6A on the front of the Nest, used to receive commands from a remote control unit. For one embodiment, the infrared receiver controls both the on-screen menuing functions and the Nest itself. |
| Connectivity connector 675 (FIG. 6D) | Shown in FIG. 6D on the rear of the Nest, serving as a USB 2.0 socket for Ethernet (RJ45) support. Alternatively, Bluetooth support and 802.11 based connectivity may be built into the Nest. |
| Solid state memory socket(s) 645 (FIG. 6C) | (Optional) Shown in FIG. 6C on the left side of the unit. For one embodiment, there are four sockets supporting various media types, including inter alia a Sony memory stick, Panasonic SD, Smart Media and Compact Flash types 1 and 2. For one embodiment, these sockets are used for checking in and out songs located on the various media types. |
| USB 2.0 OTG socket(s) 650 (FIG. 6C) | Shown in FIG. 6C underneath the solid-state memory socket(s) on the left side of the Nest. For one embodiment, these sockets are used for connecting foreign MP3 players to the Nest. As above, if the Nest acts as a USB host to other devices, then a USB 2.0 host socket can be used in place of an OTG socket. |
| IEEE 1394 socket 655 (FIG. 6C) | (Optional) Shown in FIG. 6C on the left side of the Nest, to the right of the USB 2.0 socket. For one embodiment, this socket is used for connecting IEEE 1394 devices to the Nest, for example, to create backups of the hard disk inside the Nest. |
| Mini-jack socket | On the front of the Nest, providing analog stereo audio out for hooking up headphones to the Nest. |
| Optical digital audio out | On the back of the Nest, used for playback of movies. For one embodiment, when movies with Dolby digital audio are played, the digital audio is sent out through this connector. |

TABLE I-continued

Nest Hardware I/O Interfaces

| Hardware Interface | Description |
| --- | --- |
| Optical digital audio in | On the back of the Nest, enabling connection of digital audio out from digital cable or DBS receivers that support digital audio out. |

For one embodiment of the present invention, the Nest includes hardware components used as a front panel interface for interaction and viewing data from the Nest, and hardware components necessary to provide Nest functionality. Specifically, the user interface components of the Nest include one or more of the following:

TABLE II

Nest Hardware User Interface Components

| Component | Description |
| --- | --- |
| Large jog dial 615 (FIG. 6A) | (Optional) Shown in FIG. 6A on the left front of the Nest, and used to scroll up and down and select items displayed on the Nest front display. In addition, for one embodiment, the jog dial enables a user to choose a menu item and select it. For one embodiment of the present invention, the jog dial is a rolling jog dial, pressable for selection. For an alternative embodiment of the present invention, the jog dial is a spring based jog dial that does not fully roll, but is used as a five function jog dial; namely, single click scroll up, single click scroll down, selection click toggle by pressing on the jog dial, and duration based scroll up and scroll down for two additional functions. |
| Navigation arrows and select buttons 610 (FIG. 6A) | (Optional) Shown in FIG. 6 on the front of the Nest, used to navigate through the Nest front display menu options, as well as to select and create play lists. |
| On/off button 630 (FIG. 6A) | (Optional) Shown in FIG. 6A on the left front of the Nest, used to turn the Nest on and off. For one embodiment, holding down the On/Off button resets the Nest, in case the Nest is stuck. For one embodiment, the Nest may also be reset by holding down the On/Off button during powering up of the Nest after plugging in the DC power. |
| Green and yellow LEDs 635 (FIG. 6A), or a single multi-colored LED | (Optional) Shown in FIG. 6A underneath he On/Off button on the left front of the Nest, used to give a user feedback when various actions occur, and to provide error codes based on the LED's behavior - lit, turned off, blinking or blinking quickly. |
| Red infrared receiver and LED 625 (FIG. 6A) | (Optional) Shown in FIG. 6A on the left front of the Nest, to the right of the green and yellow LEDs, for flashing when an infrared signal is being received from a remote control. |
| Record button 640 (FIG. 6A) | (Optional) Shown in FIG. 6A on the left front of the Nest. For one embodiment, the record button begins automatic song record from an audio and video source; namely, from one of the sets of analog left and right audio and analog video in connectors. For one embodiment, the record button is a toggle button to start and stop recording, and the red LED lights up while the Nest is recording. |
| LED display 605 (FIG. 6A) | (Optional) Shown in FG. 6A on the front of the Nest, used to display information about the state the Nest is in. For one embodiment, the LCD is at least approximately four inches in width by three inches in height, and supports at least five lines of text. The LCD is used as an interface, together with the various navigation buttons and jog dial, for interaction with the Nest. Alternatively, an LED display may be used instead of an LCD display. |

The functional components of the Nest include one or more of the following:

TABLE III

Nest Hardware Functional Components

| Component | Description |
| --- | --- |
| Power connector 660 (FIG. 6D) | Shown in FIG. 6D on the rear of the Nest, and used to supply DC power to the Nest, sufficient for powering the Nest, for charging the Eggs that can be placed in the Nest, and for peripherals connected to the Nest through the IEEE 1394 socket, the USB 2.0 OTG socket and the connectivity connector at the rear of the Nest. |
| Removable hard disk drive 685 (FIG. 6E) | Shown in FIG. 6E located on the right side of the Nest. Preferably, the removable hard disk drive is at least a 20 GB drive, situated within a bay, which can be removed so that the drive can be upgraded to a larger storage capacity. For one embodiment, the drive read and write rates are fast enough so that the Nest supports video reading and writing to and from the disk. |
| Optional battery compartment for backup power | For storing date and clock information when the Nest is not plugged in, so that the Nest does not lose its clock settings if it loses power. |

For one embodiment of the present invention, the Nest includes software drivers, and appropriate infrastructure to allow additional driver support as later versions are released. Specifically, the Nest includes one or more of the following device drivers:

TABLE IV

Nest Software Drivers

| Driver | | Description |
| --- | --- | --- |
| USB Device Drivers | Digital audio player support | Including inter alia MP3 and WMA support, enabling import and export to and from digital audio players. |
| | USB based hard disk support | Including inter alia DiskOnKey type products. |
| | Ethernet dongle driver support | For supporting multiple brands and chipsets of USB ethernet dongles. |
| | 802.11 dongle driver support | For supporting multiple brands and chipsets of USB 802.11. |
| | Bluetooth support | For supporting multiple brands and chipsets of Bluetooth hosting, connected through the USB connectivity socket. Alternatively, as mentioned hereinabove, the Nest may support Bluetooth internally. |
| | USB based DVD RW/CDRW support | For supporting multiple brands of USB based DVD/RW and CDRW devices, for ripping and archiving purposes. |
| IEEE 1394 Device Drivers | IEEE based DVD/RW and CDRW support | For supporting multiple brands of USB based DVD/RW and CDRW devices, for ripping and archiving purposes. |
| | IEEE 1394 based hard disk support | For backing up the internal hard disk to an external hard disk, for archiving purposes and also for upgrading to a larger hard disk. |
| Bluetooth Device Drivers | Keyboard support | For inputting data via wireless keyboard. |
| | Bluetooth 2.0 support | For data transfer from PDAs and for Bluetooth enabled MP3 players. |

For one embodiment of the present invention, the Egg supports three I/O interfaces. Specifically, the I/O interfaces include:

TABLE V

Egg Hardware I/O Interfaces

| Interface | Description |
| --- | --- |
| Female audio/video connector 820 (FIG. 8A) | Shown in FIG. 8A on the bottom of the Egg, used to output analog audio and analog video from the Egg to the Nest, the Shell and to other peripheral devices. For one embodiment, the Egg audio/video connector supports multi-system video, including inter alia PAL, NTSC and SECAM. Connection of this connector triggers the Egg to switch to an "on" state, and disconnection puts the Egg in an "off" state. |
| Female USB 2.0 OTG connector 810 (FIG. 8A) | Shown in FIG. 8A on the bottom of the Egg next to the female A/V connector, used to transfer data between the Egg and the Nest, between the Egg and a "filling station" kiosk, and between the Egg and another Egg. |
| Stereo mini-jack 530 (FIG. 5) | (Optional) Shown in FIG. 5, located on the side of the Egg, used to attach headphones to listen to music on the Egg. For one embodiment, the stereo mini-jack acts as one of the on/off mechanisms of the Egg. |

For one embodiment, the user interface components of the Egg include:

TABLE VI

Egg Hardware User Interface Components

| Component | Description |
| --- | --- |
| Jog dial 520 (FIG. 5) | Shown in FIG. 5 on top of the Egg. |
| LCD display 510 (FIG. 5) | Shown in FIG. 5 on a side of the Egg. |
| SD memory slot | Not shown. |
| Left and right buttons at top of egg | Not shown. |

For one embodiment, the Egg includes the following software I/O drivers:

TABLE VII

Egg Software I/O Drivers

| Driver | Description |
| --- | --- |
| USB 2.0 OTG drivers | For peripheral transfer. |

In accordance with one embodiment of the present invention, the Shell provides the capability to listen to songs and play lists that are being played on the Egg through a user's car deck. Specifically, the Shell includes one or more of the following I/O interfaces:

TABLE VIII

Shell Hardware I/O Interfaces

| Interface | Description |
| --- | --- |
| Male USB 2.0 OTG connector 710 (FIG. 7B) | Shown in FIG. 7B, located on the top of the Shell, used primarily to supply power to the Egg and to recharge the Egg's rechargeable battery. |
| Male audio/video connector 720 (FIG. 7B) | User to receive analog audio and analog video and pass it to the FM/RF transmitter located in the Shell. |

For one embodiment, the Shell includes the following hardware components:

TABLE IX

Shell Hardware Components

| Component | Description |
| --- | --- |
| Bluetooth transmitter | (Optional) On top of the Shell. |
| Bluetooth cassette recorder | (Optional) Inside the Shell. |
| FM transmitter | Selectable frequency is determined from among a plurality of frequencies displayed on the Egg display, by a setting on the Shell. For one embodiment, both even and odd frequencies are supported for international use. For one embodiment, the FM transmitter includes Radio Data System (RDS) functionality so that when an RDS FM deck receives a signal from the transmitter, it identifiers an Egg name and ID#. |
| RF transmitter | (Optional) For video and audio transmission |

For one embodiment of the present invention, the Nest includes at least one of the following functions:

TABLE X

Nest Functionality

| Function | Description |
| --- | --- |
| Automatic song record | A user tunes in a channel on a digital cable or DBS box, and activates the record function. The Nest begins to record and |

TABLE X-continued

Nest Functionality

| Function | Description |
|---|---|
| | index songs played from that moment on. Recording continues until the cannel is changed on the digital cable or DBS box, or until the user instructs the Nest to stop recording, for example, through a remote control unit. |
| Selective song record | A user chooses one or more artists, albums and song names from a list, or enters such data. The user tunes the digital cable or DMS box to a desired channel to selectively record from. The Nest waits for a song that matches the selected criteria, and records the song into the Nest. |
| Auxiliary song record | A user connects an auxiliary device, such as a CD player, to the Nest, by connecting audio out from the CD player mini-jack to the left and right RCA audio in on the front of the Nest. The Nest is set to record, and the CD is played on the CD player. The Nest begins to digitize ("rip") songs played on the CD player, and stores each song in a separate file. The Nest identifies the song and sores the identifying meta-data in the Nest library. |
| On screen play list creation | A user creates play lists from songs located on the Nest, using a remote control unit to make selections, from an on-screen menuing system displayed on a television. |
| Checking in and out songs and play lists | A user checks songs and play lists in and out from the Nest to one or more eggs located in the Nest cradles, using a remote control unit to make selections, from an on-screen menuing system displayed on a television. For one embodiment of the present invention, permission to check out a particular song or play list is subject to a flexible and configurable digital rights management system. |
| Backing up the Nest for archiving | A user creates a backup of the Nest hard drive for archiving and disk upgrade purposes. For one embodiment, backup is supported through an IEEE 1394 socket, or USB 2.0 sockets, or over TCP/IP connectivity. This function enables the user to upgrade seamlessly to a larger hard disk and not lose data. |
| DBS/Cable recording | A user records a video into MPEG-4 VHS quality. |
| Line input recording | A user records analog audio from a line input, and the Nest identifies the meta-data. |
| Nest front display | (Optional) For one embodiment, the Nest front display includes one or more of (i) album covers, (ii) play list organization, (iii) setup screens, (iv) meta-data confirmation, (v) meta-data entry, (vi) organization of songs, (vii) deletion of songs, (viii) one or more sorted views, (ix) statistics including number of songs recorded in a period of time, (x) data and time setup, (xi) connectivity setup, (xii) Nest registration and naming setup, and (xiii) Egg registration and naming setup. |

For one embodiment of the present invention, the Nest and Egg devices support mechanisms to update software in the devices. Software updates are transported to the Nest by one or more of the following:

Placing software on the Egg via a kiosk, such as in a retail environment. When the Egg is subsequently placed in the Nest cradle, the software upgrade is passed to the Nest, and the Nest updates itself and also updates the Egg, as necessary.

Software is received over broadcast medium in the form of video transmission, for example, through the vertical blanking line, or through other video based or audio based data transfer mechanisms.

Software is received over the Internet through the Nest's connectivity connector.

For one embodiment of the present invention, Egg and Nest software updates have a recovery method so that if power is lost during a software update, for example, if an Egg is pulled out during a software update, a rollback can be applied to revert to the previous software version.

For one embodiment of the present invention, the Egg includes at least one of the following functions: (i) playing a song; (ii) selecting a play list and playing it; (iii) next and previous song; (iv) fast forward and rewind; (v) status checking; and (vi) transfer songs or play lists from one Egg to another.

The Egg may receive control commands through the USB connector. (Refer to Table V hereinabove.) Specifically, when connected to a Nest, the Nest may issue control commands to the Egg, such as a command to advance to the next song;

when connected to the Shell, the Shell may issue control commands to the Egg, such as a command to search for a free FM frequency; and when connected to a docking station, such as a docking station for the Egg in a room of a house, the docking station may receive infra red commands issued by a user, and translate them into control commands to the Egg over the USB connector.

Figure 9:
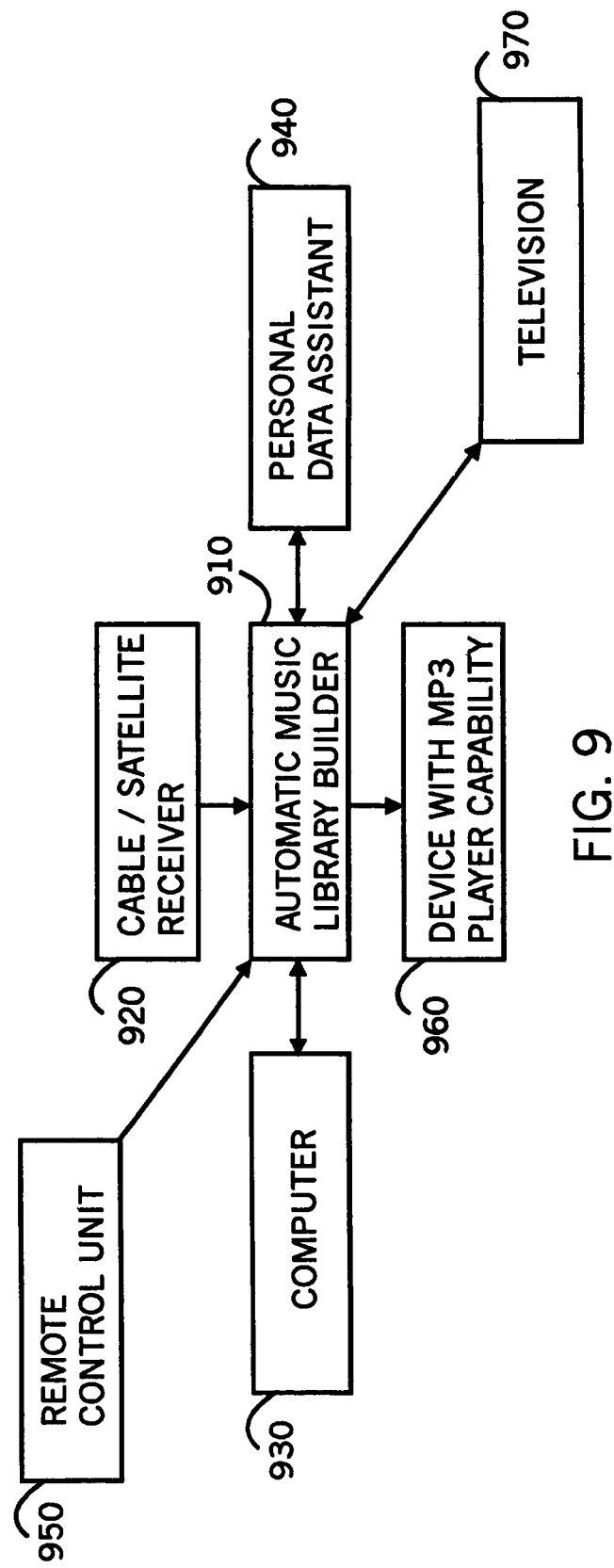
FIG. 9 is a simplified block diagram illustrating interconnectivity of a Nest with other devices in accordance with an embodiment of the present invention.

Reference is now made to FIG. 9, which is a simplified block diagram illustrating interconnectivity of an automatic music library builder with other devices, in accordance with one embodiment of the present invention. Shown in FIG. 9 is an automatic music library builder 910, receiving audio and video feed from a cable or satellite receiver 920 that broadcasts music channels. Music library builder 910 generates an MP3 music database in accordance with one embodiment of the present invention, optionally filtering broadcast songs according to pre-defined listener settings and preferences.

Optionally, music library builder 910 interconnects with a computer 930 and a personal data assistant (PDA) 940. Listener settings and preferences can be set on computer 930 or PDA 940, and loaded therefrom onto music library builder 910. Music library builder 910 can be programmed and controlled using computer 930 or PDA 940. Music library builder 910 can also be controlled using a remote control unit 950, using an infra-red (IR) or radio frequency (RF) signal.

After automatic music library builder 910 generates a digital music database such as an MP3 database, the database can be streamed to computer 930 or transferred to a PDA 940, with appropriate digital rights management (DRM) algorithms, for playback. Alternatively, the database can be transferred to a portable device 960 with MP3 player capability through a removable memory unit such as a compact disk or memory card.

For one embodiment, automatic music library builder 910 includes a user interface, albeit a limited user interface, that enables a listener to select and categorize songs that are automatically imported into his digital music library. For an alternative embodiment of the present invention, a listener can specify his settings on his computer or PDA, and then load them into the device of an embodiment of the present invention using a USB cable or memory medium.

For one embodiment, the user interface displays the current song, a yes/no indicator, and the cumulative number of songs already recorded. For one embodiment, the user interface also enables a user to view an index of all songs recorded on the current memory unit, and to view an index of all songs recorded on all memory units.

For an alternate embodiment of the present invention, automatic music library builder 910 uses a television 970 to display a user interface. For one embodiment, automatic library builder 910 includes a video out connector that can be used to connect into television 970. Selections from menu screens displayed on television 970 are made using a control device, such as remote control unit 950, the control device having directional buttons for left-right-up-down and a button for select for one embodiment.

An enhanced embodiment of the present invention incorporates digital rights management. Specifically, meta-data for a song can also include the number of times the song was played on the broadcast music channel. Such number is used to limit the number of times a listener can access the song from his music library by another digital music player.

In reading the above description, persons skilled in the art will realize that there are many apparent variations that can be applied to the methods and systems described. Thus, with reference to FIGS. 3 and 4, it may be appreciated that the analog audio and the video frame containing meta-data may be captured from different sources, instead of from a single source. Meta-data for broadcast songs may be available, for example, at a broadcaster's Internet site.

Alternatively, meta-data for broadcast songs may be extracted from a video or still image camera that photographs a display screen of a radio that includes meta-data. For example, XM and Sirius satellite radios display meta-data on their screens. Often broadcasters transmit meta-data in an encrypted form, and thus use of a camera enables determination of meta-data without the need to decrypt an encrypted data stream.

For an alternate embodiment of the present invention, meta-data may be included within a video broadcast, for example, as data within a vertical blanking channel. For such an embodiment, the present invention obtains meta-data by extraction from the vertical blanking channel.

It may be appreciated that the Eggs of the present invention may receive digital music from other devices, in addition to the Nest. Thus the Eggs may be compatible with kiosks, such as music kiosks located in music distribution stores used for listening to songs prior to purchase. For one embodiment, when an Egg is checked in with a Nest, the digital music received from other devices and stored within the Egg is archived on the Nest.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A system for use in conjunction with radios, comprising:
a handheld music player, comprising:
 a casing;
 a first transfer socket on said casing, through which a song is transferred to a radio transmitter;
 a second transfer socket on said casing, through which meta-data for the song is transferred to the radio transmitter; and
 circuitry for determining a designated radio broadcast frequency in response to a control command received from the radio transmitter; and
a radio transmitter, external to said music player, comprising:
 circuitry for transmitting the song and the meta-data for the song to a radio at the designated radio broadcast frequency; and
 circuitry for issuing a control command to said music player, instructing said music player to determine the designated broadcast frequency.

2. The system of claim 1 wherein said circuitry for determining determines the designated frequency by searching for a free radio frequency.

3. The system of claim 1 wherein said circuitry for determining comprises a frequency selector, for selecting the designated radio broadcast frequency.

4. The system of claim 1 wherein said circuitry for determining comprises a tuner for scanning radio frequencies.

5. The system of claim 1 wherein the meta-data is transferred to the radio transmitter through said second transfer socket as radio data system (RDS) data.

6. A method for transmitting audio to a radio, comprising:
transferring a song, and meta-data for the song, by a handheld music player, to a radio transmitter;
issuing a control command, by the radio transmitter, to the music player, instructing the music player to determine a designated broadcast frequency;
receiving, by the music player, the control command from the radio transmitter;
determining, by the music player, the designated radio broadcast frequency in response to said receiving; and
transmitting the song and the meta-data for the song, by the radio transmitter to the radio at the designated radio broadcast frequency.

7. The method of claim 6 wherein said determining comprises scanning, by the music player, radio frequencies.

8. The method of claim 6 wherein said determining comprises searching, by the music player, for a free radio frequency.

9. The method of claim 6 wherein said transferring meta-data for the song comprises transferring, by the music player, the meta-data as radio data system (RDS) data.

* * * * *